(12) United States Patent
Takahata

(10) Patent No.: US 11,906,829 B2
(45) Date of Patent: *Feb. 20, 2024

(54) DISPLAY SYSTEM AND HEAD-UP DISPLAY

(71) Applicant: Japan Display Inc., Tokyo (JP)

(72) Inventor: Masashi Takahata, Tokyo (JP)

(73) Assignee: Japan Display Inc., Tokyo (JP)

( * ) Notice: Subject to any disclaimer, the term of this patent is extended or adjusted under 35 U.S.C. 154(b) by 7 days.

This patent is subject to a terminal disclaimer.

(21) Appl. No.: 17/742,077

(22) Filed: May 11, 2022

(65) Prior Publication Data

US 2022/0269121 A1 Aug. 25, 2022

(51) Int. Cl.
| | | |
|---|---|---|
| *G02F 1/133* | (2006.01) | |
| *G02F 1/1334* | (2006.01) | |
| *G01K 3/00* | (2006.01) | |
| *G01K 7/16* | (2006.01) | |
| *G01K 1/02* | (2021.01) | |
| *G02B 27/01* | (2006.01) | |

(52) U.S. Cl.
CPC ......... *G02F 1/13306* (2013.01); *G01K 1/026* (2013.01); *G01K 3/005* (2013.01); *G01K 7/16* (2013.01); *G02B 27/0101* (2013.01); *G02F 1/1334* (2013.01)

(58) Field of Classification Search
CPC ... G02F 1/13306; G02F 1/1334; G01K 1/026; G01K 3/005; G01K 7/16; G02B 27/0101
See application file for complete search history.

(56) References Cited

U.S. PATENT DOCUMENTS

| | | | |
|---|---|---|---|
| 9,734,776 B2 | 8/2017 | Jehara | |
| 9,753,283 B2 | 9/2017 | Nambara | |
| 11,644,700 B2 * | 5/2023 | Takahata | ............ G02F 1/133626 349/33 |
| 2006/0077321 A1* | 4/2006 | Ukawa | ................ G02F 1/13476 349/113 |
| 2007/0176887 A1* | 8/2007 | Uehara | ................ G02F 1/1323 345/102 |

FOREIGN PATENT DOCUMENTS

| | | |
|---|---|---|
| JP | 2015-200720 A | 11/2015 |
| JP | 2015-210328 A | 11/2015 |

\* cited by examiner

*Primary Examiner* — Edward J Glick
*Assistant Examiner* — David Y Chung
(74) *Attorney, Agent, or Firm* — K&L Gates LLP

(57) ABSTRACT

A display system includes: a transmissive liquid crystal display panel; a scattering panel having a scattering area provided with a scattering portion; a temperature detector having a temperature detection area provided with a resistor element; a light source configured to emit projection light to the liquid crystal display panel; and a controller configured to control operations of the scattering panel and the light source based on an output of the temperature detector corresponding to a temperature of the resistor element. A display area of the liquid crystal display panel, the scattering area, and the temperature detection area overlap one another. The projection light that has passed through the display area and the scattering area is projected onto a light-transmitting projection target. When an output indicating that the temperature of the resistor element is a predetermined temperature or higher is acquired, the controller causes the scattering portion to scatter light.

6 Claims, 20 Drawing Sheets

FIG.1
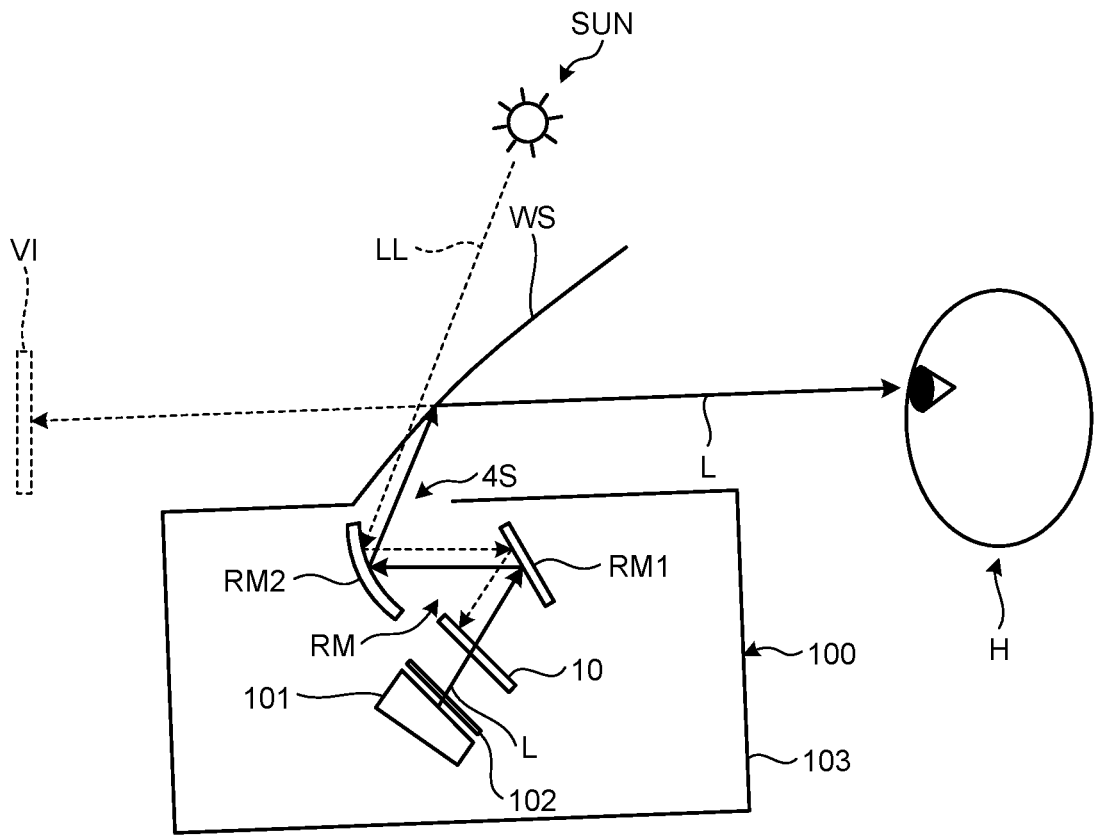
FIG.2
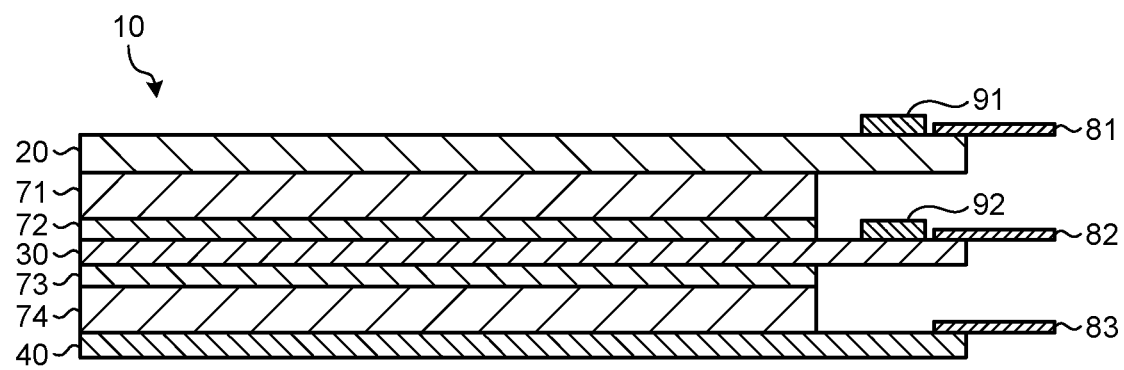
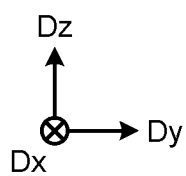

FIG.11
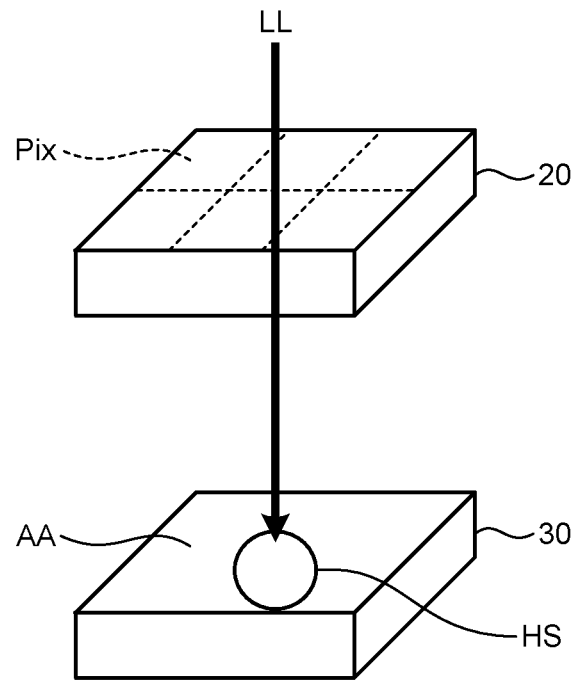
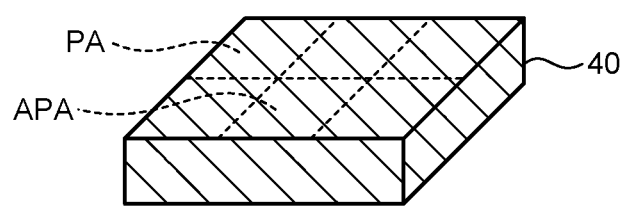
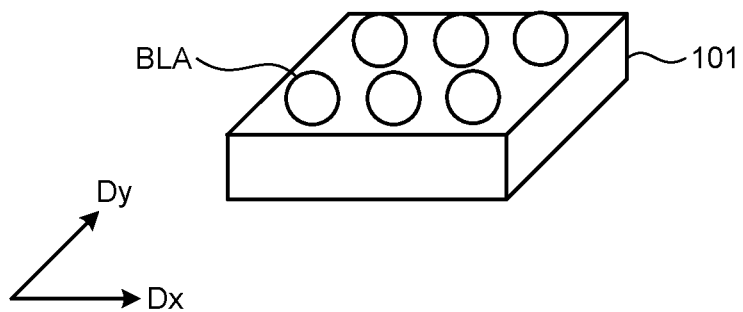

FIG.12
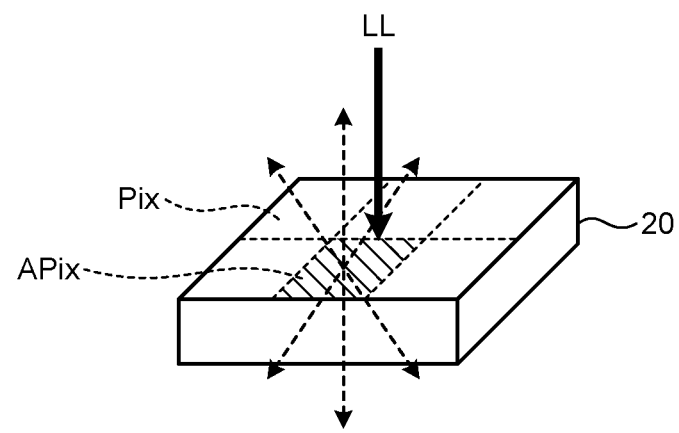
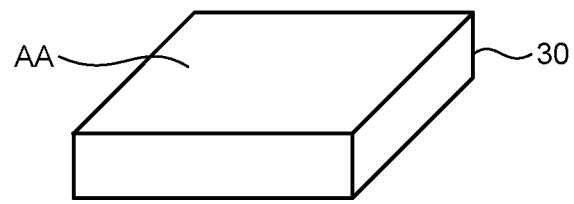
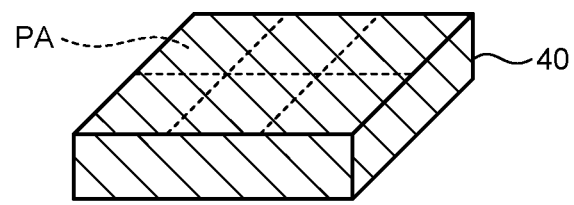
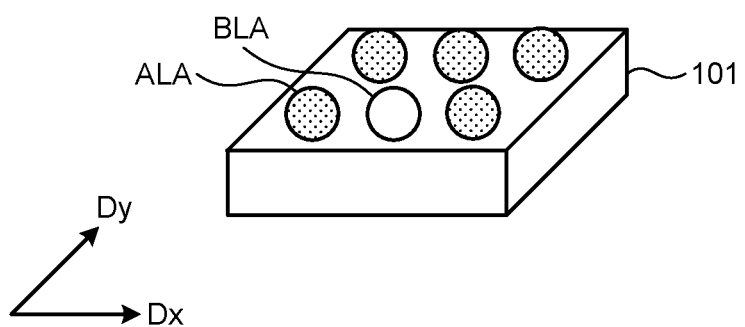

FIG.13
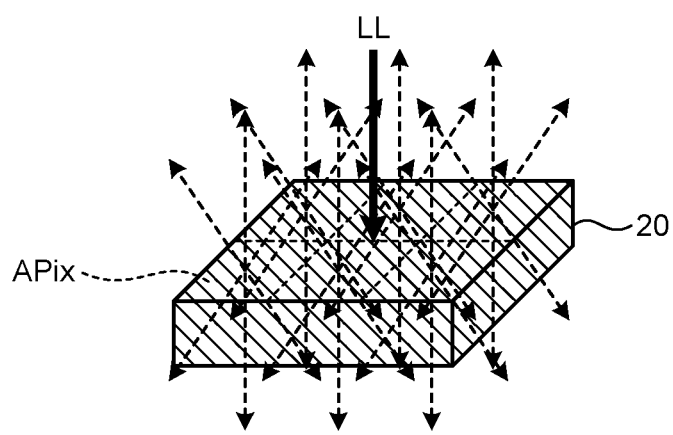
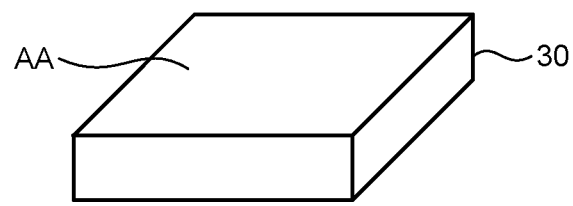
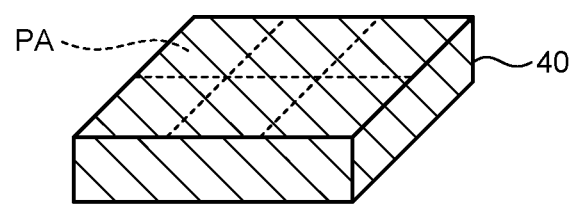
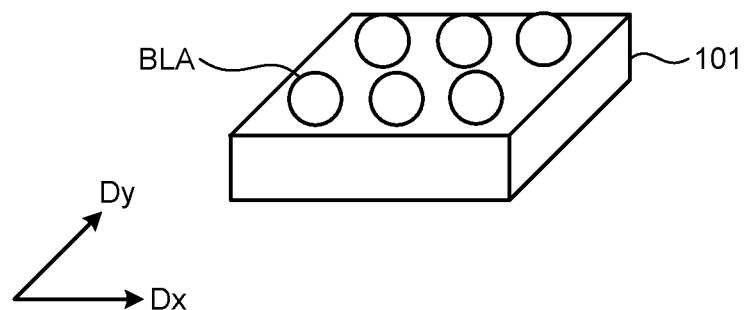

FIG.15

| OPERATION MODE | TEMPERATURE MEASUREMENT RESULT | DISPLAY OPERATION | TEMPERATURE SENSOR MEASUREMENT OPERATION | SCATTERING PANEL OPERATION | BACKLIGHT OPERATION |
|---|---|---|---|---|---|
| A | LOWER THAN 60°C | 60 fps | 60 fps | TRANSMISSION IN ALL PORTIONS IN ALL PERIODS | TURN ON ALL PORTIONS IN ALL PERIODS |
| B | 60°C TO 75°C | 60 fps | 60 fps | SCATTERING IN BLANKING PERIODS | TURN OFF IN BLANKING PERIODS |
| C | 75°C TO 90°C | 60 fps | 60 fps | ALL SCATTERING IN BLANKING PERIODS, SCATTERING FOR 1/2 FRAME PERIOD OF DISPLAY ONCE EVERY TWO FRAMES OF DISPLAY FOR HIGH-TEMPERATURE AREA | TURN OFF IN BLANKING PERIODS, TURN OFF FOR 1/2 FRAME PERIOD OF DISPLAY ONCE EVERY TWO FRAMES OF DISPLAY FOR HIGH-TEMPERATURE AREA |
| D | EQUAL TO OR HIGHER THAN 90°C | 60 fps | 60 fps | ALL SCATTERING IN BLANKING PERIODS, SCATTERING FOR ONE FRAME PERIOD OF DISPLAY ONCE EVERY TWO FRAMES OF DISPLAY FOR ANOMALOUS HIGH-TEMPERATURE AREA | TURN OFF IN BLANKING PERIODS, TURN OFF FOR ONE FRAME PERIOD OF DISPLAY ONCE EVERY TWO FRAMES OF DISPLAY FOR ANOMALOUS HIGH-TEMPERATURE AREA |

FIG.16

| | F1 | | F2 | | F3 | | F4 | |
|---|---|---|---|---|---|---|---|---|
| | SF1 | SF2 | SF1 | SF2 | SF1 | SF2 | SF1 | SF2 |
| DISPLAY PANEL | DISPLAY PERIOD | BLANKING | DISPLAY PERIOD | BLANKING | DISPLAY PERIOD | BLANKING | DISPLAY PERIOD | BLANKING |
| TEMPERATURE SENSOR | NON-OPERATED | TEMPERATURE MEASUREMENT PERIOD | NON-OPERATED | TEMPERATURE MEASUREMENT PERIOD | NON-OPERATED | TEMPERATURE MEASUREMENT PERIOD | NON-OPERATED | TEMPERATURE MEASUREMENT PERIOD |
| SCATTERING PANEL | TRANSMISSION | TRANSMISSION | TRANSMISSION | TRANSMISSION | TRANSMISSION | TRANSMISSION | TRANSMISSION | TRANSMISSION |
| BACKLIGHT | ON | ON | ON | ON | ON | ON | ON | ON |

FIG.19

| | F1 | | F2 | | F3 | | F4 | |
|---|---|---|---|---|---|---|---|---|
| | SF1 | SF2 | SF1 | SF2 | SF1 | SF2 | SF1 | SF2 |
| DISPLAY PANEL | DISPLAY PERIOD | BLANKING | DISPLAY PERIOD | BLANKING | DISPLAY PERIOD | BLANKING | DISPLAY PERIOD | BLANKING |
| TEMPERATURE SENSOR | NON-OPERATED | TEMPERATURE MEASUREMENT PERIOD | NON-OPERATED | TEMPERATURE MEASUREMENT PERIOD | NON-OPERATED | TEMPERATURE MEASUREMENT PERIOD | NON-OPERATED | TEMPERATURE MEASUREMENT PERIOD |
| SCATTERING PANEL | TRANSMISSION | ALL SCATTERING | ALL SCATTERING | ALL SCATTERING | TRANSMISSION | ALL SCATTERING | ALL SCATTERING | ALL SCATTERING |
| BACKLIGHT | ON | OFF | OFF | OFF | ON | OFF | OFF | OFF |

S: R (ONLY FOR SCATTERING PORTION AND LIGHT SOURCE ELEMENT OVERLAPPING WITH ANOMALOUS HIGH-TEMPERATURE AREA)

FIG.20
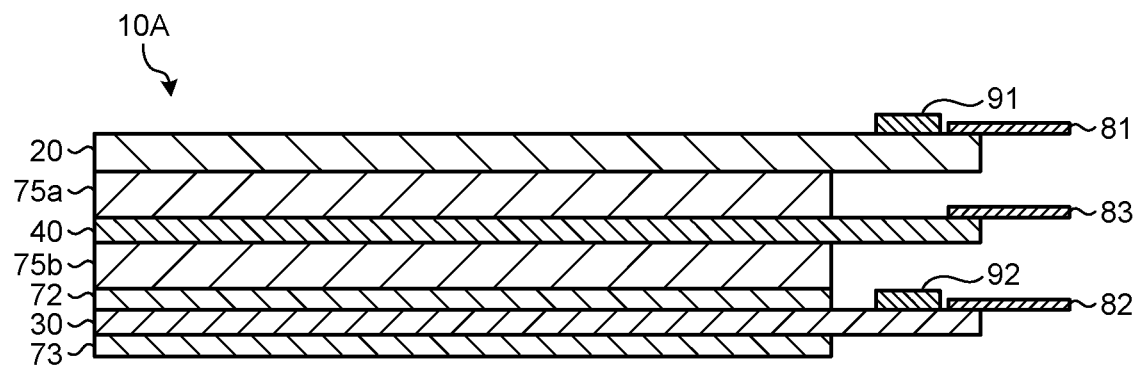
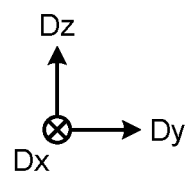
FIG.21
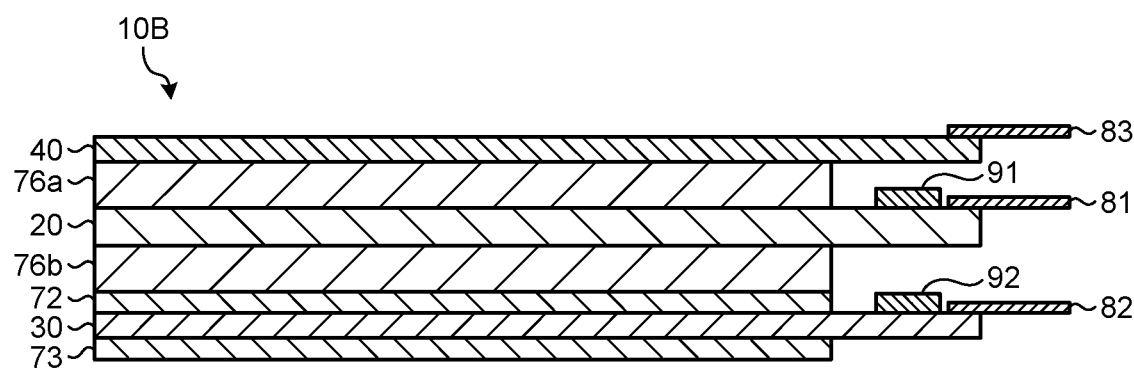
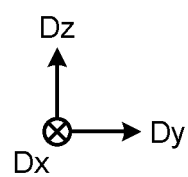

FIG.22
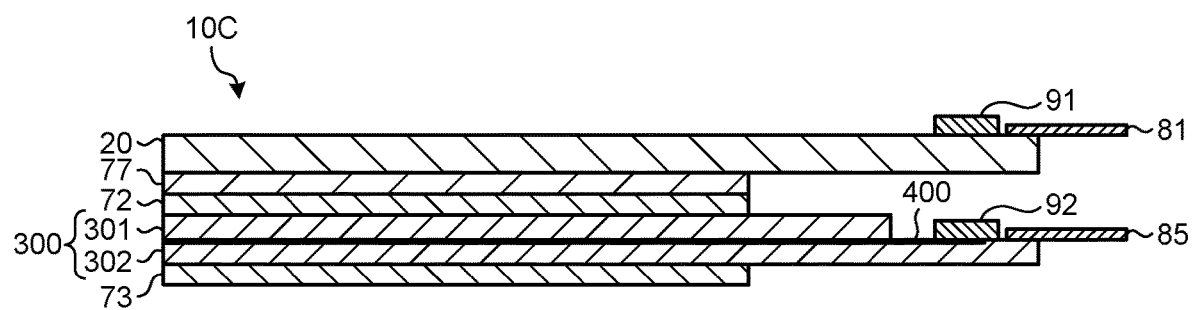
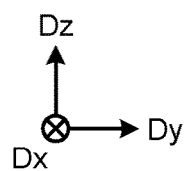

DISPLAY SYSTEM AND HEAD-UP DISPLAY

CROSS-REFERENCE TO RELATED APPLICATION

This application claims the benefit of priority from Japanese Patent Application No. 2021-081917 filed on May 13, 2021, the entire contents of which are incorporated herein by reference.

BACKGROUND

1. Technical Field

What is disclosed herein relates to a display system and a head-up display.

2. Description of the Related Art

As described in Japanese Patent Application Laid-open Publication No. 2015-210328 (JP-A-2015-210328), a head-up display (HUD) device that projects an image onto a member having a light-transmitting property, such as glass, has been known. According to the technique in JP-A-2015-210328, sunlight may be incident on the HUD device through an optical system. When the HUD device is exposed to the sunlight condensed by the optical system, the temperature of a portion thereof exposed to the sunlight becomes high and the HUD device may be adversely affected. To address this, as described in Japanese Patent Application Laid-open Publication No. 2015-200720, a temperature information acquisition method has been known in which, based on changes in an electric resistance value of an electrode provided as a temperature detection element, a temperature of a configuration including the temperature detection element is determined.

Even if a configuration provided as a combination of the conventional techniques can detect increase in the temperature of the HUD device by the temperature detection element, such a configuration can only partially or fully shut down the HUD. For this reason, it has been difficult to prevent further increase in the temperature caused by continuous incidence of the sunlight.

For the foregoing reasons, there is a need for a display system and a head-up display capable of restraining further increase in temperature after the temperature becomes equal to or higher than a predetermined temperature.

SUMMARY

According to an aspect, a display system includes: a transmissive liquid crystal display panel; a scattering panel having a scattering area in which a scattering portion capable of being switched between scattering and transmission of light is provided; a temperature detector having a temperature detection area in which a temperature detection resistor element is provided; a light source configured to emit projection light to the liquid crystal display panel; and a controller configured to control operations of the scattering panel and the light source based on an output of the temperature detector corresponding to a temperature of the temperature detection resistor element. A display area of the liquid crystal display panel, the scattering area, and the temperature detection area overlap one another. The projection light that has passed through the display area and the scattering area is projected onto a light-transmitting projection target to allow a virtual image to be viewed by a user. When an output indicating that the temperature of the temperature detection resistor element is equal to or higher than a predetermined temperature is acquired, the controller causes the scattering portion to scatter light.

BRIEF DESCRIPTION OF THE DRAWINGS

FIG. 1 is a descriptive diagram for schematically explaining a display system;

FIG. 2 is a schematic view illustrating an example of a multilayered configuration of a display panel;

FIG. 11 is a schematic view illustrating a mechanism of increase in the temperature of the liquid crystal display panel;

FIG. 12 is a view illustrating a mechanism for restraining increase in the temperature of the liquid crystal display panel by local-scattering sunlight by the scattering panel;

FIG. 13 is a view illustrating a mechanism for restraining increase in the temperature of the liquid crystal display panel by total-scattering sunlight by the scattering panel;

FIG. 15 is a table illustrating a list of operation modes of the display system;

FIG. 16 is a time chart illustrating an example of an operation mode A illustrated in FIG. 15;

FIG. 19 is a time chart illustrating an example of an operation mode D illustrated in FIG. 15;

FIG. 20 is a schematic view illustrating another example of the multilayered configuration of the display panel;

FIG. 21 is a schematic view illustrating still another example of the multilayered configuration of the display panel; and FIG. 22 is a schematic view illustrating still another example of the multilayered configuration of the display panel.

DETAILED DESCRIPTION

Figure 3:
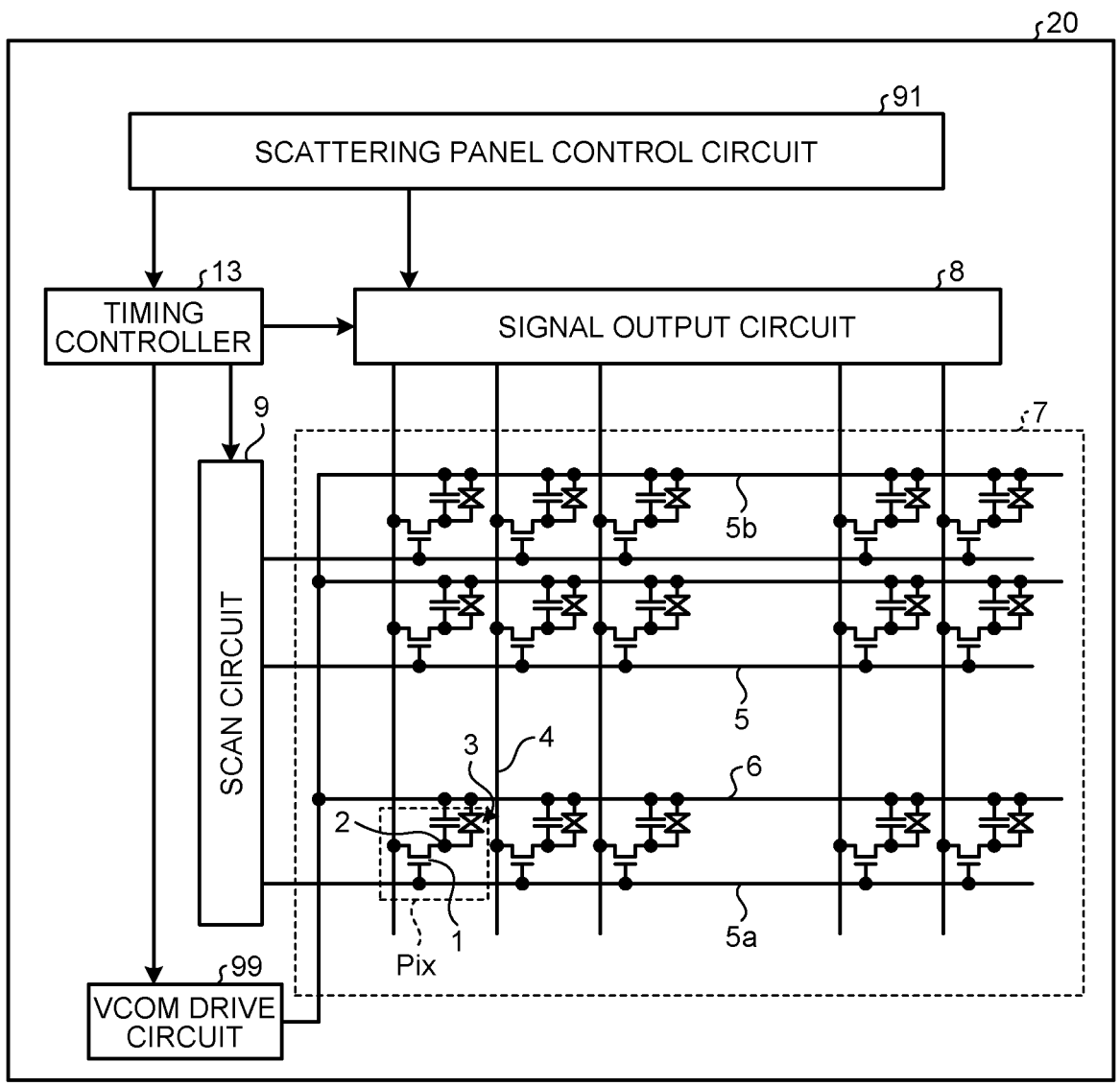
FIG. 3 is a schematic circuit diagram illustrating a main configuration of a scattering panel.

Hereinafter, embodiments of the present disclosure will be described with reference to the drawings. What is disclosed herein is merely an example, and it is needless to say that appropriate modifications within the gist of the invention at which those skilled in the art can easily arrive are encompassed in the scope of the present disclosure. In the drawings, widths, thicknesses, shapes, and the like of the components can be schematically illustrated in comparison with actual modes for clearer explanation. They are, however, merely examples and do not limit interpretation of the present disclosure. In the present specification and the drawings, the same reference numerals denote components similar to those previously described with reference to the drawing that has already been referred to, and detail explanation thereof can be appropriately omitted.

First Embodiment

FIG. 1 is a descriptive diagram for schematically explaining a display system 100. The display system 100 includes a backlight 101, a diffusion plate 102, a display panel 10, and an optical system RM configured to enlarge an image from the display panel 10 and project the image onto a projection plate WS.

A housing 103 accommodates therein the backlight 101 functioning as a light source device, the display panel 10 configured to output an image using projection light L from the backlight 101, the diffusion plate 102 provided between the display panel 10 and the backlight 101, and the optical system RM.

The projection light L emitted from the backlight 101 is diffused by the diffusion plate 102 and reaches the display panel 10, so that a part or all of the projection light L passes through the display panel 10 to be light of an image. In the display system 100 in a first embodiment, the optical system RM includes a mirror member RM1 and a mirror member RM2 and guides the projection light L to the projection plate WS after the projection light L passes through the display panel 10. The mirror member RM1 is a plane mirror, and the mirror member RM2 is a concave mirror. The mirror member RM1 may be a concave mirror. The mirror member RM2 may be a plane mirror. The optical system RM is not limited thereto and may include one mirror member or three or more mirror members.

After the light of an image passes through the optical system RM, the light is reflected by the projection plate WS and reaches a user H, whereby the light is recognized as a virtual image VI in a visual field of the user H. That is to say, the display system 100 in the first embodiment functions as an HUD configured to project the image onto the projection plate WS. It is sufficient that the projection plate WS is a member having a light-transmitting property and located on the visual line of the user H. The projection plate WS is, for example, a windscreen (windshield) of a vehicle or a light-transmitting plate member called a combiner of a vehicle, which is provided as a separate member from the windscreen.

As illustrated in FIG. 1, sunlight LL may enter an opening 4S of the housing 103 in the display system 100 depending on a relative position of the sun SUN. The sunlight LL is guided by the optical system RM and is condensed toward the display panel 10 in some cases. The condensed sunlight increases the temperature of the display panel 10 during its operation, and the increase in the temperature may cause anomalies in the display panel 10. For this reason, detection of a temperature state of the display panel 10 is desired. It is also desired that further increase in the temperature can be restrained when the temperature of the display panel 10 becomes equal to or higher than a predetermined temperature.

Therefore, a temperature detector 40, which will be described later, is provided to the display panel 10 in the first embodiment. The temperature detector 40 is provided to be capable of detecting the temperature of the display panel 10. Thus, in the embodiment, the temperature detector 40 can detect temperature change caused by light condensed toward the display panel 10. Deterioration in display output quality due to the display panel 10 can be reduced when operations of the display panel 10 and a scattering panel 20, which will be described later, are controlled based on the temperature change generated in the display panel 10 such that, for example, the scattering panel 20 reduces further increase in the temperature of a high-temperature portion that would be caused by light from the backlight 101.

FIG. 2 is a schematic view illustrating an example of a multilayered configuration of the display panel 10. The display panel 10 illustrated in FIG. 2 has the multilayered configuration in which the scattering panel 20, a first adhesive layer 71, a polarizing plate 72, a liquid crystal display panel 30, a polarizing plate 73, a second adhesive layer 74, and the temperature detector 40 are stacked from one surface side to the other surface side of the display panel 10. Hereafter, a direction along the stacking direction of the multilayered configuration of the display panel 10 is a third direction Dz. One of two directions along a plane orthogonal to the third direction Dz is a first direction Dx, and the other is a second direction Dy.

The scattering panel 20 has a scattering area in which transmission and scattering of incident light can be switched. Specifically, the scattering panel 20 is a polymer-dispersed liquid crystal (PDLC) panel.

FIG. 3 is a schematic circuit diagram illustrating a main configuration of the scattering panel 20. The scattering panel 20 includes a scattering area 7, a signal output circuit 8, a scan circuit 9, a VCOM drive circuit 99, and a timing controller 13. Hereinafter, it is assumed that the above-mentioned one surface side is a projection side and the other surface side is a rear side.

Figure 4:
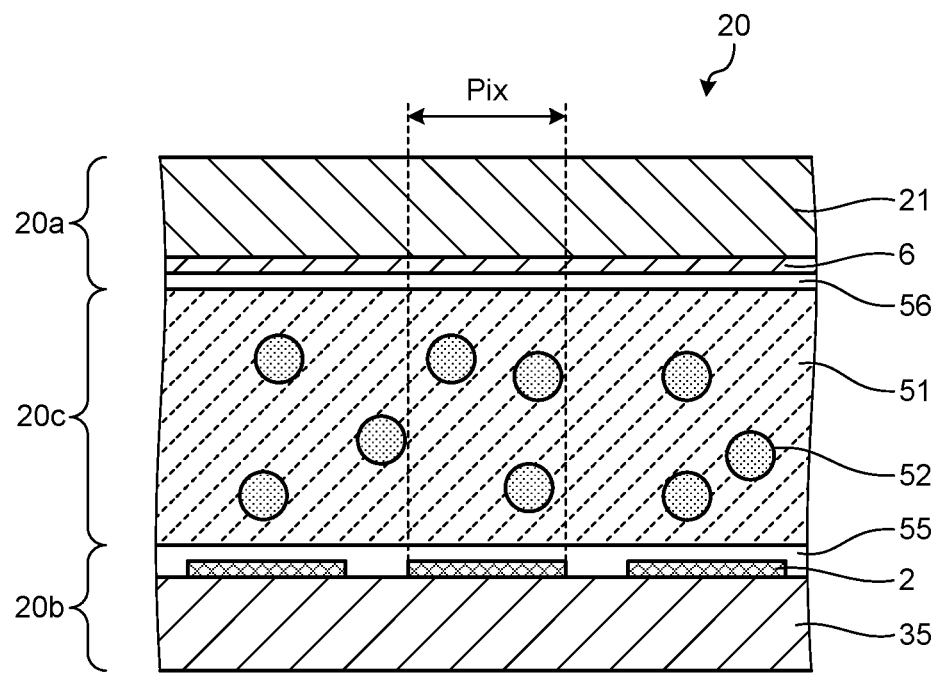
FIG. 4 is a schematic cross-sectional view of the scattering panel.

A plurality of scattering portions Pix are arranged in a matrix with a row-column configuration in the scattering area 7. Each of the scattering portions Pix includes a switching element 1 and two electrodes. FIG. 3 and FIG. 4, which will be described later, illustrate a pixel electrode 2 and a common electrode 6 as the two electrodes.

FIG. 4 is a schematic cross-sectional view of the scattering panel 20. The scattering panel 20 includes two opposing substrates and a liquid crystal 20c sealed between the two substrates. Hereinafter, it is assumed that one of the two substrates is a first substrate 20b and the other is a second substrate 20a.

The first substrate 20b includes a light-transmitting glass substrate 35, the pixel electrodes 2 stacked on a second substrate 20a side of the glass substrate 35, and an orientation film 55 covering the pixel electrodes 2. The pixel electrodes 2 are provided individually for the respective scattering portions Pix. The second substrate 20a includes a light-transmitting glass substrate 21, the common electrodes 6 stacked on a first substrate 20b side of the glass substrate 21, and an orientation film 56 covering the common electrodes 6. Each of the common electrodes 6 has a plate-like or film-like shape and is shared by more than one of the scattering portions Pix.

The liquid crystal 20c in the first embodiment is PDLC (Polymer Dispersed Liquid Crystal). Specifically, the liquid crystal 20c includes bulk 51 and fine particles 52. The orientation of the fine particles 52 changes in accordance with the potential difference between the pixel electrodes 2 and the common electrodes 6 in the bulk 51. Individual control of the potential of the pixel electrode 2 for each scattering portion Pix controls the degree of at least either of light transmission or scattering for each scattering portion Pix.

In the first embodiment explained with reference to FIG. 4, the pixel electrodes 2 and the common electrodes 6 face each other with the liquid crystal 20c interposed therebetween. Alternatively, the scattering panel 20 may have a configuration in which the pixel electrodes 2 and the common electrodes 6 are provided on one substrate and the orientation of the liquid crystal 20c is controlled by electric fields generated by the pixel electrodes 2 and the common electrodes 6.

Next, a mechanism for controlling the potentials of the pixel electrodes 2 and the common electrodes 6 will be explained. As illustrated in FIG. 3, each switching element 1 is a switching element using a semiconductor, such as a thin film transistor (TFT). One of the source and the drain of the switching element 1 is coupled to one (pixel electrode 2) of the two electrodes. The other of the source and the drain of the switching element 1 is coupled to a signal line 4. The gate of the switching element 1 is coupled to a scan line 5. The scan line 5 gives a potential to open and close between the source and the drain of the switching element 1 under control by the scan circuit 9. The scan circuit 9 controls the potential.

In the example illustrated in FIG. 3, the signal lines 4 are aligned along one (row direction) of arrangement directions of the scattering portions Pix. The signal lines 4 extend along the other (column direction) of the arrangement directions of the scattering portions Pix. Each of the signal lines 4 is shared by the switching elements 1 of the scattering portions Pix aligned in the column direction. The scan lines 5 are aligned along the column direction. The scan lines 5 extend along the row direction. Each of the scan lines 5 is shared by the switching elements 1 of the scattering portions Pix aligned in the row direction.

In explanation of the first embodiment, a direction in which the scan lines 5 extend is the first direction Dx (row direction), and a direction in which the scan lines 5 are aligned is the second direction Dy (column direction). In FIG. 3, among the scan lines 5 arranged in the second direction Dy, one of the scan lines 5 located at both ends in the second direction Dy is a scan line 5a, and the other is a scan line 5b.

The common electrodes 6 are coupled to the VCOM drive circuit 99. The VCOM drive circuit 99 applies, to the common electrodes 6, a potential functioning as a common potential. At timing when the scan circuit 9 applies the potential as a drive signal to the scan lines 5, the signal output circuit 8 outputs gradation signals, which will be described later, to the signal lines 4, thereby charging the liquid crystal (fine particles 52) functioning as a storage capacitor and a capacitive load formed between the pixel electrodes 2 and the common electrodes 6. Consequently, voltages between the scattering portions Pix and the common electrodes 6 become voltages corresponding to the gradation signals. After the drive signal is no longer applied, the liquid crystal (fine particles 52) as the storage capacitor and the capacitive load retains voltages corresponding to the gradation signals. The scattering degree of the liquid crystal (fine particles 52) is controlled in accordance with the voltage of each scattering portion Pix and the voltage of the corresponding common electrode 6. For example, the liquid crystal 20c may be formed by polymer-dispersed liquid crystal having such characteristics that the scattering degree increases as the voltage between each scattering portion Pix and the common electrode 6 increases or polymer-dispersed liquid crystal having such characteristics that the scattering degree increases as the voltage between each scattering portion Pix and the common electrode 6 decreases.

The timing controller 13 is a circuit configured to control operation timing of the signal output circuit 8, the scan circuit 9, and the VCOM drive circuit 99. A scattering panel control circuit 91 outputs signals for controlling the signal output circuit 8 and the timing controller 13 under control by a scattering panel processor 1103 of a controller 110, which will be described later. The signal output circuit 8, the scan circuit 9, and the VCOM drive circuit 99 operate cooperatively under timing control by the timing controller 13 to control operations of the scattering portions Pix of the scattering panel 20.

As illustrated in FIG. 2, the first adhesive layer 71 bonds the plate surface of the scattering panel 20 and the plate surface of the polarizing plate 72 to each other. Specifically, the first adhesive layer 71 is an optical clear adhesive (OCA), and both sides of the first adhesive layer 71 have adhesive properties.

The liquid crystal display panel 30 selectively transmits light from the backlight 101 to display and output an image. Specifically, the liquid crystal display panel 30 is a transmissive liquid crystal display panel. The liquid crystal display panel 30 has a display area AA (refer to FIG. 10) in which a plurality of pixels arranged in a matrix with a row-column configuration are provided. The liquid crystal display panel 30 outputs an image corresponding to projection contents of the virtual image VI in the display area AA. The projection light L that has passed through the display area AA is projected onto a projection target (for example, the projection plate WS) to allow the user H to view the virtual image VI.

The polarizing plates 72 and 73 transmit light polarized in a specific direction and do not transmit light polarized in directions other than the specific direction. The polarizing plate 73 transmits light polarized in the specific direction among light emitted from the backlight 101. Among light that has passed through the polarizing plate 73, the polarizing plate 72 transmits light that has passed through the pixels provided in the display area AA of the liquid crystal display panel 30. The polarization direction of light that the polarizing plate 72 transmits corresponds to twisting, caused by the pixels, in the polarization direction of light. Although an adhesive layer is not illustrated in FIG. 2 and other drawings, the polarizing plates 72 and 73 are bonded to the liquid crystal display panel 30.

The second adhesive layer 74 bonds a plate surface of the polarizing plate 73 and a plate surface of the temperature detector 40 to each other. Specifically, the second adhesive layer 74 is the OCA, and both sides of the second adhesive layer 74 have adhesive properties.

The temperature detector 40 detects the temperature of the display panel 10. The configuration of the temperature detector 40 will be explained with reference to FIG. 5.

Figure 5:
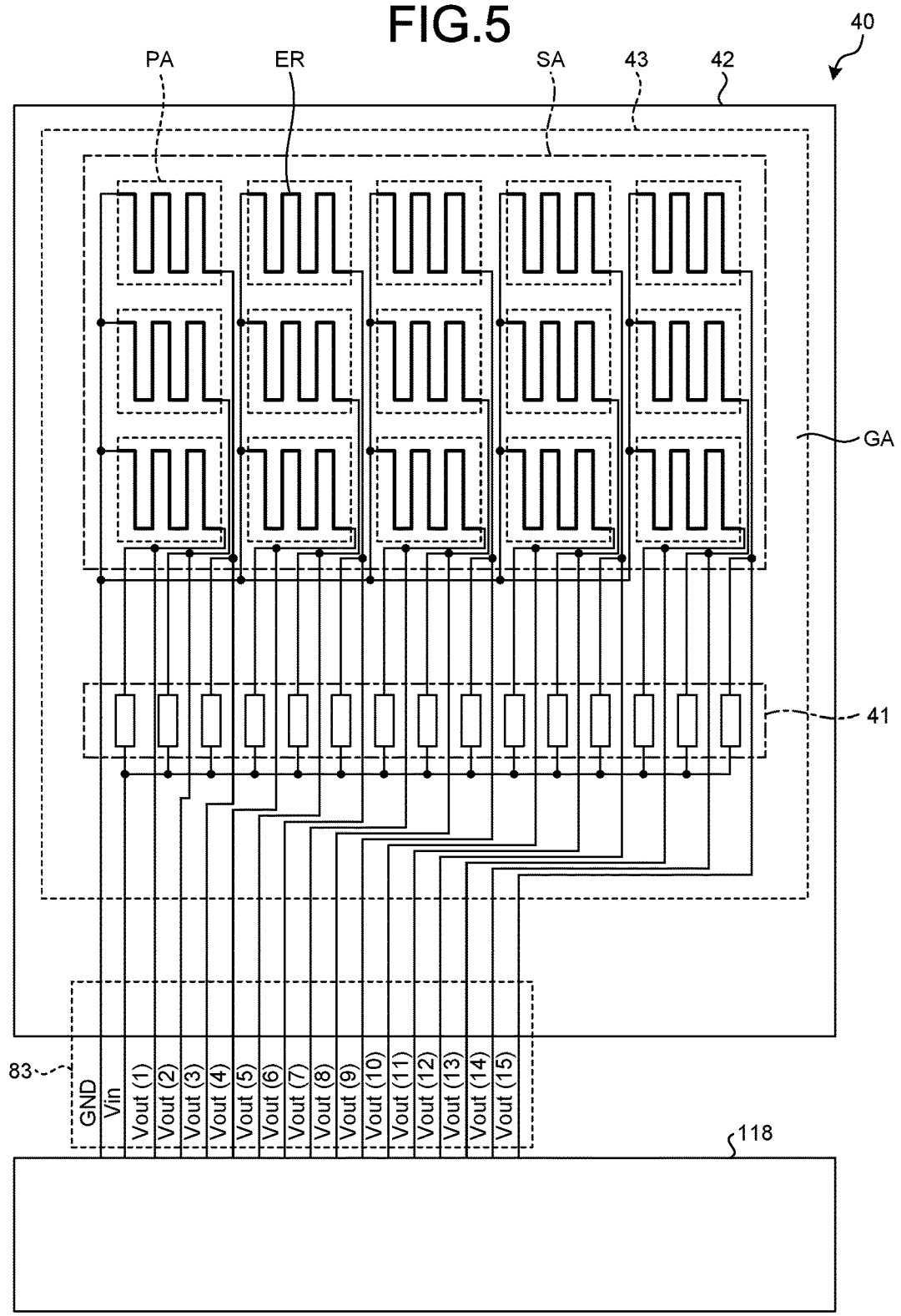
FIG. 5 is a schematic view illustrating a main configuration of a temperature detector and a control device according to a first embodiment.

FIG. 5 is a schematic view illustrating a main configuration of the temperature detector 40 and a control device in the first embodiment. As illustrated in FIG. 5, the temperature detector 40 includes a sensor base member 42 and a sensor 43.

The sensor base member 42 has a temperature detection area SA and a peripheral area GA. The temperature detection area SA includes a plurality of partial temperature detection areas PA. The partial temperature detection areas PA are areas in each of which a plurality of temperature detection resistor elements ER (hereinafter, referred to as resistors ER) included in the sensor 43 are provided. The third direction Dz is also a normal direction of the sensor base member 42.

Each resistor ER is an electric resistor formed with an alloy, a compound containing metal (metal compound), or a metal as a material. The resistor ER may be a multilayered body formed by stacking a plurality of types of materials falling under at least one of the metal, alloy, and metal compound. An expression "alloy or the like" in explanation of the first embodiment is a material capable of being employed as a composition of the resistor ER. In the example illustrated in FIG. 5, each of the resistors ER has such a shape that a plurality of L-shaped wiring lines having long sides along the second direction Dy are coupled with one another in the first direction Dx. In this example, each resistor ER is provided by coupling the L-shaped wiring lines such that the short sides of the two L-shaped wiring lines adjacent to each other in the first direction Dx are arranged in the second direction Dy in a staggered manner.

The peripheral area GA is an area between the outer periphery of the temperature detection area SA and end portions of the sensor base member 42 and is an area in which no resistor ER is provided. A plurality of reference resistor elements 41 (hereinafter, referred to as reference resistors 41) are provided in the peripheral area GA. The resistors ER provided in the partial temperature detection areas PA and the reference resistors 41 provided in the peripheral area GA form a temperature sensor.

The resistors ER and the reference resistors 41 are coupled to wiring provided in a wiring portion 83. The wiring included in the wiring portion 83 is coupled to a temperature sensor interface (I/F) 118 of the controller 110, which will be described later. The wiring provided in the wiring portion 83 includes a ground potential line GND, an input line Vin, and output lines Vout. The expression "output lines Vout" encompasses the output lines provided in correspondence with the number of resistors ER, like output lines Vout(1), Vout(2), . . . , and Vout(15). The ground potential line GND illustrated in FIG. 5 is coupled to first ends of the resistors ER. The ground potential line GND applies a ground potential to the resistors ER. The input line Vin is coupled to first ends of the reference resistors 41. The output lines Vout are coupled to second ends of the resistors ER and second ends of the reference resistors 41.

A drive signal of the temperature detector 40 is input from the input line Vin. The drive signal is output to the output lines Vout through the temperature detector 40. The intensities of signals that are output from the output lines Vout depend on the temperatures of the resistors ER coupled to the output lines Vout. That is to say, the temperatures of the partial temperature detection areas PA in which the resistors ER are provided can be detected based on the signals output from the output lines Vout.

The number of electrical resistor elements provided as the reference resistors 41 and the number of output lines Vout correspond to the number of resistors ER. The electrical resistor elements are coupled in parallel to one input line Vin. FIG. 5 illustrates an example where the number of resistors ER is 15. The signals corresponding to the temperatures of the 15 resistors ER are respectively output from the output lines Vout(1), Vout(2), . . . , and Vout(15). The number of resistors ER is not limited to 15 and can be appropriately changed. For example, the explanation with reference to FIGS. 6 and 7 to be described later exemplifies a case where 5×5=25 of the resistors ER are arranged.

As illustrated in FIG. 2, a wiring portion 81 is provided on the scattering panel 20. The wiring portion 81 includes wiring coupled to the scattering panel 20 and the scattering panel control circuit 91. A wiring portion 82 and a liquid crystal display panel control circuit 92 are provided on the liquid crystal display panel 30. The wiring portion 82 includes wiring coupled to the liquid crystal display panel 30. The liquid crystal display panel control circuit 92 is a display driver integrated circuit (DDIC). The liquid crystal display panel control circuit 92 operates the pixels of the liquid crystal display panel 30.

The arrangement of the partial temperature detection areas PA, that is, the resistors ER in the temperature detector 40 and the arrangement of the scattering portions Pix of the scattering panel 20 have a correspondence relation. The following describes the correspondence relation with reference to FIGS. 6 and 7.

Figure 6:
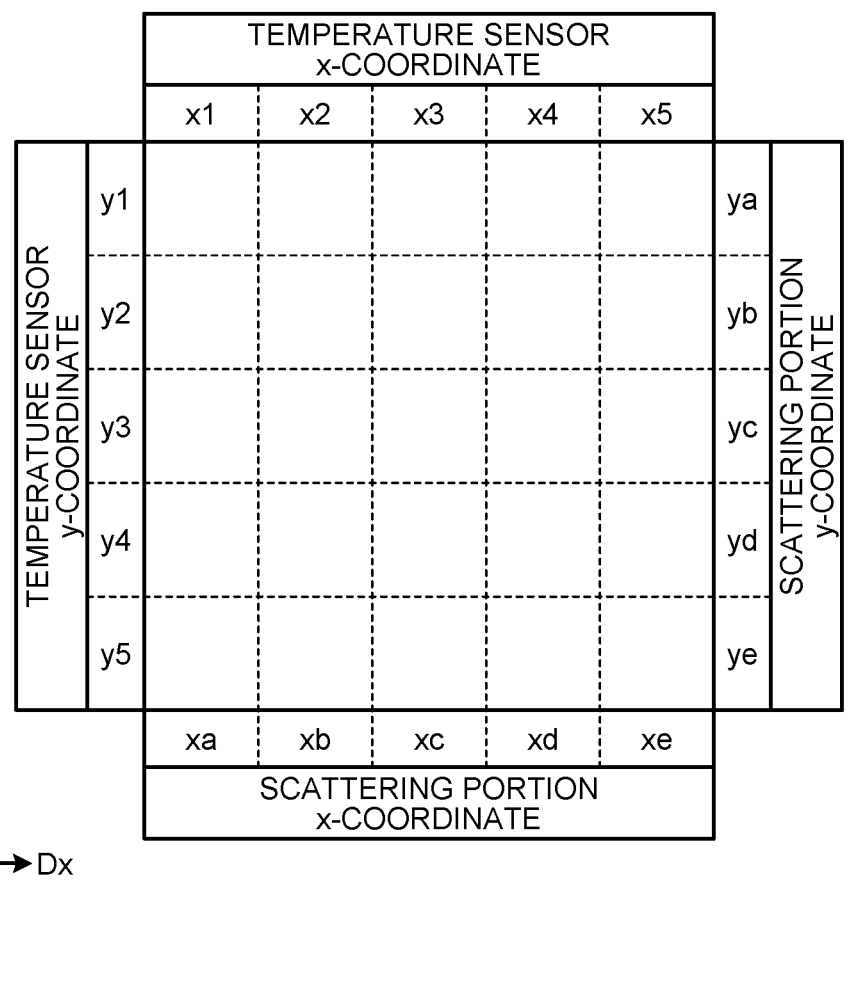
FIG. 6 is a view illustrating an example of a relation between coordinates of temperature detection resistor elements and coordinates of scattering portions.
Figure 7:
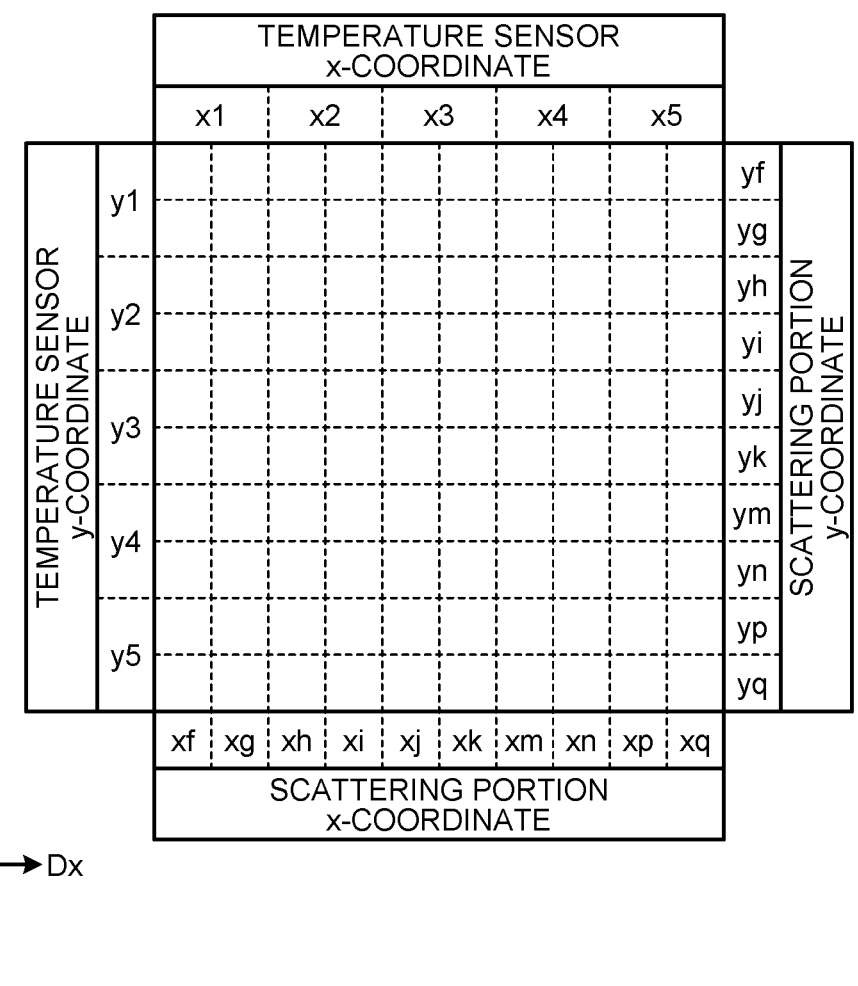
FIG. 7 is a view illustrating another example of the relation between the coordinates of the temperature detection resistor elements and the coordinates of the scattering portions.

FIG. 6 is a view illustrating an example of a relation between coordinates of the resistors ER and coordinates of the scattering portions Pix. In FIG. 6 and FIG. 7, which will be described later, the arrangement of each resistor ER in the first direction Dx is indicated by a "temperature sensor x-coordinate". The arrangement of each resistor ER in the second direction Dy is indicated by a "temperature sensor y-coordinate". For example, an expression of a resistor ER at (x1,y1) indicates a resistor ER arranged in a coordinate region that matches to both the "temperature sensor x-coordinate" of "x1" and the "temperature sensor y-coordinate" of "y1". The arrangement of each scattering portion Pix in the first direction Dx is indicated by a "scattering portion x-coordinate". The arrangement of each scattering portion Pix in the second direction Dy is indicated by a "scattering portion y-coordinate". For example, an expression of a scattering portion Pix at (xa,ya) indicates a scattering portion Pix arranged in a coordinate area that matches to both the "scattering portion x-coordinate" of "xa" and the "scattering portion y-coordinate" of "ya". Hereinafter, the "temperature sensor x-coordinate" is referred to as a T-x coordinate. The "temperature sensor y-coordinate" is referred to as a T-y coordinate. The "scattering portion x-coordinate" is referred to as an S-x coordinate. The "scattering portion y-coordinate" is referred to as an S-y coordinate.

In the example illustrated in FIG. 6, the T-x coordinate and the S-x coordinate correspond to each other on a one-to-one basis. For example, the T-x coordinate "x1" and the S-x coordinate "xa" are the same. The T-x coordinate "x2" and the S-x coordinate "xb" are the same. The other combinations of the T-x coordinates and the S-x coordinates also include combinations having a one-to-one relation.

In the example illustrated in FIG. 6, the T-y coordinate and the S-y coordinate correspond to each other on a one-to-one basis. For example, the T-y coordinate "y1" and the S-y coordinate "ya" are the same. The T-y coordinate "y2" and the S-y coordinate "yb" are the same. The other combinations of the T-y coordinates and the S-y coordinates also include combinations having a one-to-one relation.

As explained with reference to FIG. 6, the coordinate areas where the resistors ER are individually arranged and the coordinate areas where the scattering portions Pix are individually arranged may correspond to each other on a one-to-one basis. That is to say, one scattering portion Pix may be provided in a position overlapping one resistor ER in a planar viewpoint. As illustrated in FIG. 7, which will be described later, more than one of the scattering portions Pix may be provided in a position overlapping one resistor ER in the planar viewpoint. The planar viewpoint is a viewpoint when a plane orthogonal to the third direction Dz is viewed from above.

FIG. 7 is a view illustrating another example of the relation between the coordinates of the resistors ER and the coordinates of the scattering portions Pix. In the example illustrated in FIG. 7, two S-x coordinates are contained in one T-x coordinate. For example, the S-x coordinates "xf" and "xg" are contained in the T-x coordinate "x1". The S-x coordinates "xh" and "xi" are contained in the T-x coordinate "x2". As for the relations between the other T-x coordinates and the other S-x coordinates, two S-x coordinates are contained in one T-x coordinate.

In the example illustrated in FIG. 7, two S-y coordinates are contained in one T-y coordinate. For example, the S-y coordinates "yf" and "yg" are contained in the T-y coordinate "y1". The S-y coordinates "yh" and "yi" are contained in the T-y coordinate "y2". As for the relations between the other T-y coordinates and the other S-y coordinates, two S-y coordinates are contained in one T-y coordinate.

Consequently, in the example illustrated in FIG. 7, 2×2=4 of the scattering portions Pix are provided in a position overlapping one resistor ER in the planer viewpoint. For example, the scattering portions Pix at (xf,yf), (xf,yg), (xg,yf), and (xg,yg) are provided in a position overlapping the resistor ER at (x1,y1) in the planar viewpoint.

In the example with reference to FIG. 7, the correspondence relation between the number of resistors ER and the number of scattering portions Pix is on a one-to-multiple basis for both the x coordinates and the y coordinates. Alternatively, the correspondence relation may be on a one-to-multiple basis for only one of them. The correspondence relation between the number of resistors ER and the number of scattering portions Pix is not limited to 1:4 and may be 1:v, where v is a natural number of equal to or greater than 2.

The display panel 10 and the backlight 101 are coupled to the controller 110. The controller 110 will be explained below with reference to FIGS. 8 and 9.

Figure 8:
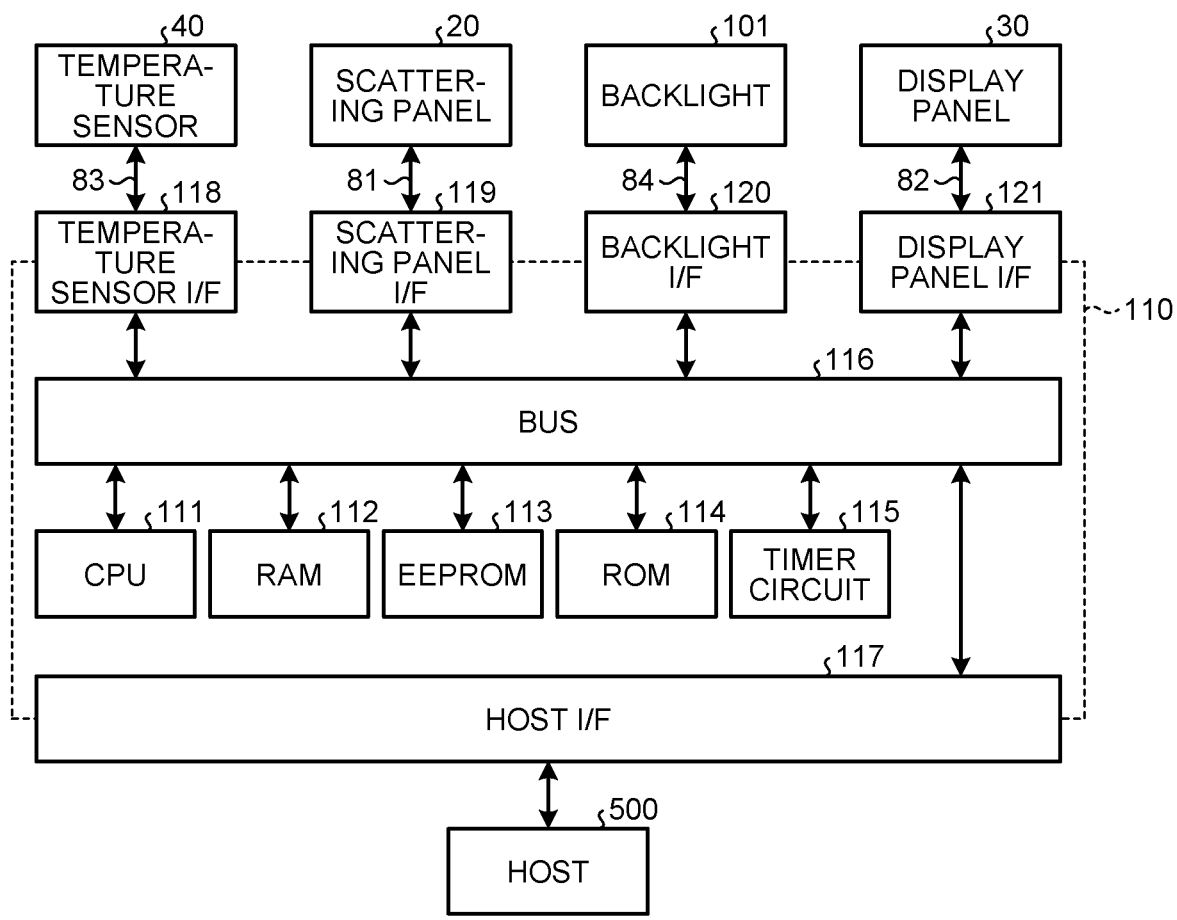
FIG. 8 is a block diagram illustrating an example of a configuration of a controller.

FIG. 8 is a block diagram illustrating an example of a configuration of the controller 110. The controller 110 includes a central processing unit (CPU) 111, a random-access memory (RAM) 112, an electrically erasable programmable read-only memory (EEPROM) 113, a read-only memory (ROM) 114, a timer circuit 115, a bus 116, a host interface (I/F) 117, the temperature sensor I/F 118, a scattering panel I/F 119, a backlight I/F 120, and a display panel I/F 121. The controller 110 is mounted on a substrate (not illustrated) provided in the housing 103.

The CPU 111 performs various arithmetic processing. The RAM 112 stores therein temporary data generated in the arithmetic processing that is performed by the CPU 111. The EEPROM 113 stores therein at least one of a software program to be read in the arithmetic processing that is performed by the CPU 111 and data to be read upon execution of the software program, in a rewritable state. The ROM 114 stores therein at least one of the software program to be read in the arithmetic processing that is performed by the CPU 111 and the data to be read upon execution of the software program, in a non-rewritable state. At least one of the EEPROM 113 and the ROM 114 stores therein the software program to be read in the arithmetic processing that is performed by the CPU 111.

The timer circuit 115 counts a lapse of time. The CPU 111 refers to a count value counted by the timer circuit 115 in the arithmetic processing where the lapse of time is used as a parameter.

The bus 116 couples various components included in the controller 110. A host 500 is coupled to the host I/F 117. The host 500 is an image output device provided externally. The display system 100 projects the virtual image VI corresponding to an image signal received from the host 500. The wiring portion 83 of the temperature detector 40 is coupled to the temperature sensor I/F 118. The wiring portion 81 of the scattering panel 20 is coupled to the scattering panel I/F 119. A wiring portion 84 of the backlight 101 is coupled to the backlight I/F 120. The wiring portion 82 of the liquid crystal display panel 30 is coupled to the display panel I/F 121.

Figure 9:
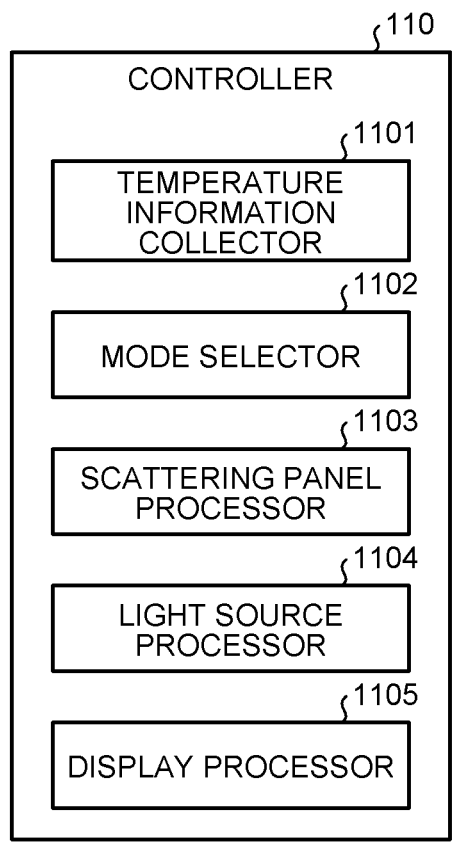
FIG. 9 is a block diagram illustrating a functional configuration of the controller.

FIG. 9 is a block diagram illustrating a functional configuration of the controller 110. The controller 110 functions as a temperature information collector 1101, a mode selector 1102, the scattering panel processor 1103, a light source processor 1104, and a display processor 1105, by the arithmetic processing that is performed by the CPU 111.

The temperature information collector 1101 operates the temperature detector 40 to collect information indicating the temperatures of the respective partial temperature detection areas PA. Specifically, the temperature information collector 1101 applies the drive signal to the input line Vin of the wiring portion 83 and determines the temperatures of the resistors ER provided in the partial temperature detection areas PA based on the intensities of the signals that are output from the output lines Vout.

Data indicating a correspondence relation between the intensities of the signals that are output from the output lines Vout and the temperatures of the resistors ER is stored in at least one of the above-mentioned EEPROM 113 and ROM 114. The data may be threshold data enabling determination from the signals whether the temperatures of the resistors ER are equal to or higher than the predetermined temperature. As a more specific example, the data may be threshold data enabling determination from the signals whether the temperatures of the resistors ER are lower than a first temperature, equal to or higher than the first temperature and lower than a second temperature, equal to or higher than the second temperature and lower than a third temperature, or higher than the third temperature. In other words, the data need not be data enabling strict numerical determination of the temperatures of the resistors ER. It is needless to say that the data may be the data enabling the strict numerical determination of the temperatures of the resistors ER.

The mode selector 1102 determines an operation mode of the display system 100 based on the information indicating the temperatures of the partial temperature detection areas PA collected by the temperature information collector 1101. Details of the operation modes will be described later.

The scattering panel processor 1103 controls operations of the scattering panel 20 based on the information indicating the temperatures of the partial temperature detection areas PA collected by the temperature information collector 1101 and the operation mode determined by the mode selector 1102.

The light source processor 1104 controls operations of the backlight 101 based on the information indicating the temperatures of the partial temperature detection areas PA collected by the temperature information collector 1101 and the operation mode determined by the mode selector 1102.

The display processor 1105 controls operations of the liquid crystal display panel 30 based on the information indicating the temperatures of the partial temperature detection areas PA collected by the temperature information collector 1101 and the operation mode determined by the mode selector 1102.

Hereinafter, the basic concept of the operations of the display system 100 will be explained with reference to FIGS. 10 to 13 before explaining the operation modes.

Figure 10:
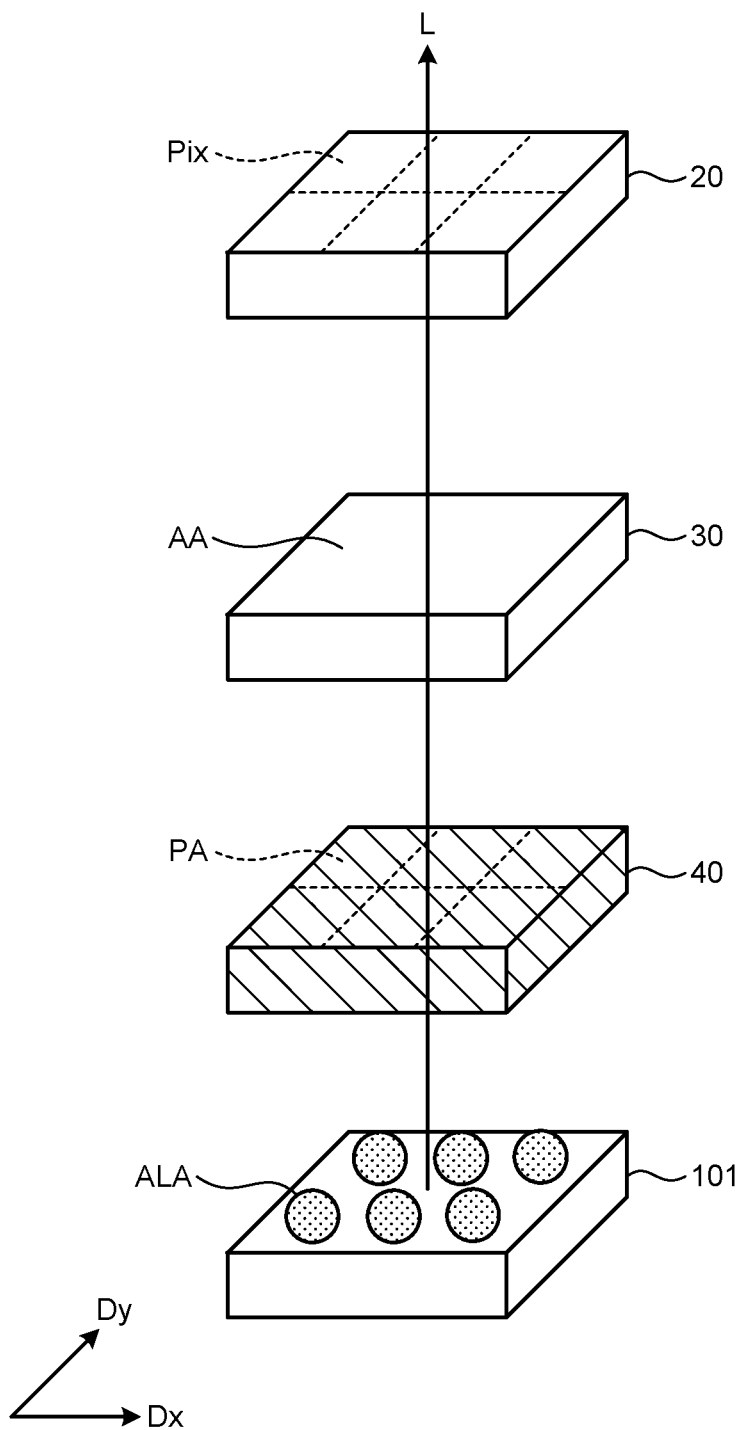
FIG. 10 is a schematic view illustrating operations of the scattering panel, a liquid crystal display panel, the temperature detector, and a light source when a virtual image is projected.

FIG. 10 is a schematic view illustrating operations of the scattering panel 20, the liquid crystal display panel 30, the temperature detector 40, and the backlight 101 when the virtual image VI is projected. Although the scattering panel 20, the liquid crystal display panel 30, and the temperature detector 40 are separated from each other in FIGS. 10 to 13, the scattering panel 20, the liquid crystal display panel 30, and the temperature detector 40 are actually in contact with each other as explained with reference to FIG. 2. Although the coordinates of the partial temperature detection areas PA and the scattering portions Pix are 2×3 in FIGS. 10 to 13, the coordinates are only schematic for the sake of simplicity of explanation and illustration.

The backlight 101 includes a plurality of light source elements. The backlight 101 is provided such that the coordinate areas of the partial temperature detection areas PA explained with reference to FIGS. 6 and 7 are individually switched to be turned on and off. Specifically, for example, the light source elements are provided one for each of the coordinate areas of the partial temperature detection areas PA.

When the temperature of the liquid crystal display panel 30 is lower than the predetermined temperature, all of the light source elements are turned on. In FIGS. 10 to 13, the light source elements in an ON state are illustrated as turned-on light source elements ALA with dot patterns on them. Light from the turned-on light source elements ALA passes through the temperature detector 40. After that, the light, as the projection light L for illuminating the liquid crystal display panel 30 from the other surface side (rear side) thereof and projecting the virtual image VI, passes through the liquid crystal display panel 30 and travels toward the one surface side (projection side) of the liquid crystal display panel 30. The projection light L passes through the scattering panel 20 that is controlled to transmit light through all the scattering portions Pix, and is projected onto the projection target (for example, the projection plate WS). The predetermined temperature is, for example, the first temperature (60° C.), which will be described later, but is not limited thereto. Details of the predetermined temperature will be described later.

FIG. 11 is a schematic view illustrating a mechanism of increase in the temperature of the liquid crystal display panel 30. When the sunlight LL explained with reference to FIG. 1 is incident on the position of the display panel 10 and the temperature of the liquid crystal display panel 30 is still lower than the predetermined temperature, the scattering panel 20 is in a state of transmitting light. The sunlight LL therefore reaches the liquid crystal display panel 30. The sunlight LL increases the temperature of the liquid crystal display panel 30. In particular, since the polarizing plate 72 and the polarizing plate 73 transmit only light polarized in the specific direction, the polarizing plate 72 and the polarizing plate 73 act to block most of the sunlight LL, resulting in increase in the temperatures of the polarizing plate 72 and the polarizing plate 73. Such temperature increase leads to increase in the temperature of the liquid crystal display panel 30 to which the polarizing plate 72 and the polarizing plate 73 are bonded. FIG. 11 illustrates, as a hot spot HS, a spot where the temperature increases due to the sunlight LL in the display area AA of the liquid crystal display panel 30. The temperature of the hot spot HS is transferred to a high-temperature area APA as the partial temperature detection area PA in a position overlapping the hot spot HS in the planar viewpoint. With increase in the temperature of the resistor ER arranged in the high-temperature area APA, an output from the output line Vout coupled to the resistor ER reflects the increase in the temperature.

FIG. 12 is a view illustrating a mechanism for restraining increase in the temperature of the liquid crystal display panel 30 by local-scattering the sunlight LL by the scattering panel 20. When the temperature increase of the liquid crystal display panel 30, such as the hot spot HS explained with reference to FIG. 11, is detected in the high-temperature area APA, the scattering area Pix in a position overlapping the high-temperature area APA in the planar viewpoint is controlled to scatter light. FIG. 12 illustrates, as a scattering state area APix, the scattering portion Pix at the position overlapping the high-temperature area APA illustrated in FIG. 11 in the planar viewpoint. Scattering of the sunlight LL in the scattering state area APix can restrain the sunlight LL from being concentratedly emitted to the liquid crystal display panel 30. Consequently, further temperature increase at the hot spot HS illustrated in FIG. 11 can be restrained.

As illustrated in FIG. 12, a turned-off light source element BLA as the light source element in a position overlapping the high-temperature area APA and the scattering state area APix in the planar viewpoint is controlled to be turned off. Radiation of heat from the light source element can thereby be reduced. In FIGS. 12 and 13, the turned-off light source elements BLA in an off state among the light source elements provided in the backlight 101 are illustrated by outlined circles.

FIG. 13 is a view illustrating a mechanism for restraining increase in the temperature of the liquid crystal display panel 30 by total-scattering the sunlight LL by the scattering panel 20. As illustrated in FIG. 13, when all the scattering portions Pix included in the scattering panel 20 are controlled in the same manner as the above-mentioned scattering state area APix to scatter light, the sunlight LL can be scattered more reliably over a wider area. The sunlight LL can thereby be restrained from being concentratedly emitted to the liquid crystal display panel 30 more reliably. Consequently, further temperature increase at the hot spot HS illustrated in FIG. 11 can be restrained more reliably.

As illustrated in FIG. 13, radiation of heat from the light source elements can be further restrained by setting all the light source elements included in the backlight 101 to be the turned-off light source elements BLA, that is, turning off all the light source elements.

Processing involved in operation control of the display system 100 will be explained below with reference to FIG. 14.

Figure 14:
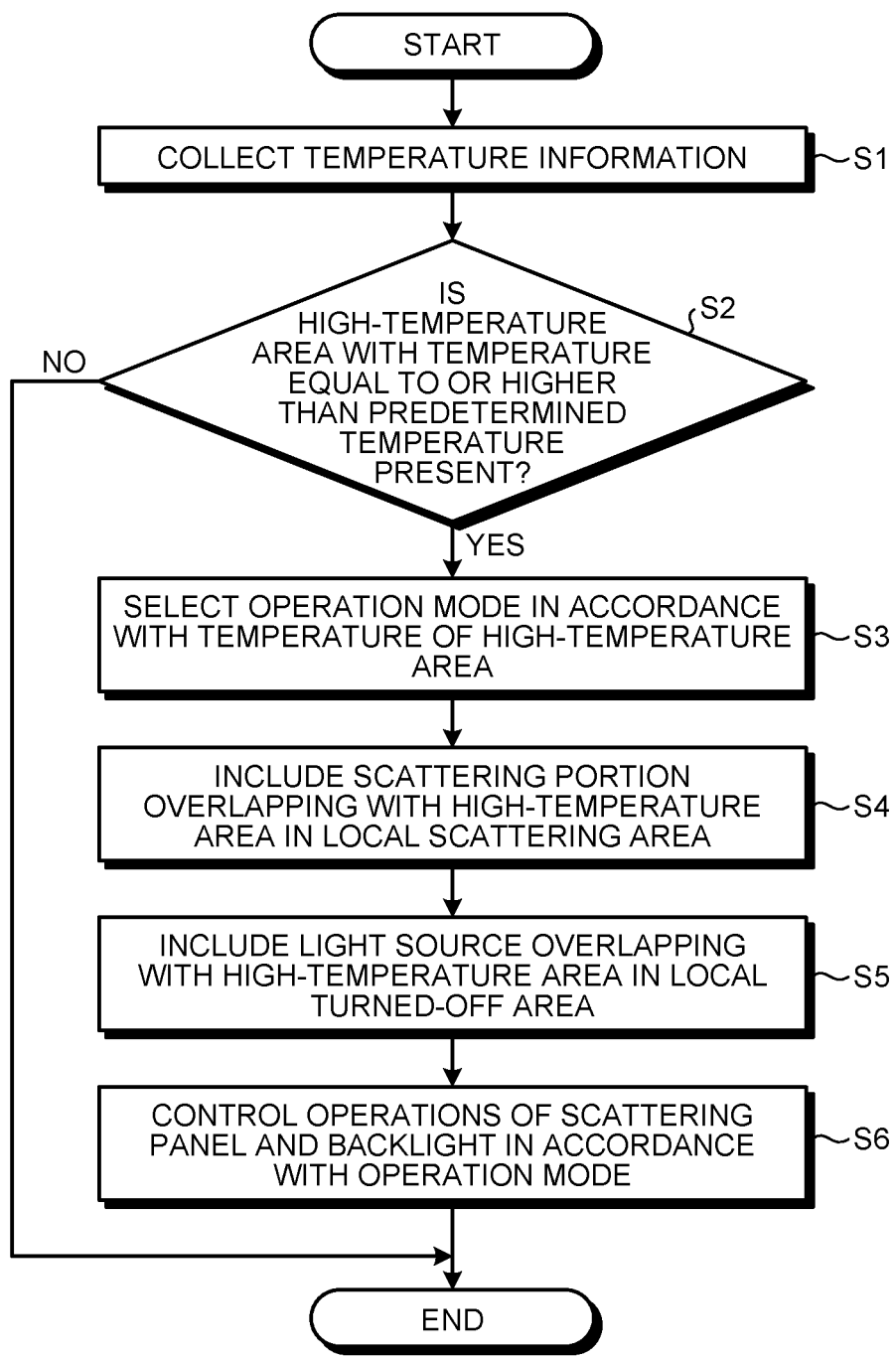
FIG. 14 is a flowchart illustrating processing involved in operation control of the display system.

FIG. 14 is a flowchart illustrating the processing involved in the operation control of the display system 100. First, the temperature information collector 1101 collects temperature information (step S1). With the processing at step S1, information indicating the temperatures of the respective partial temperature detection areas PA, that is, the temperatures of respective portions of the liquid crystal display panel 30 that overlap the partial temperature detection areas PA in the planar viewpoint, is acquired.

After the processing at step S1, the mode selector 1102 determines whether the partial temperature detection area PA that has become a high-temperature area having a temperature equal to or higher than the predetermined temperature is present (step S2). When it is determined that the partial temperature detection area PA that has become the high-temperature area having a temperature equal to or higher than the predetermined temperature is present (Yes at step S2), the mode selector 1102 sets the operation mode of the display system 100 to be an operation mode corresponding to the temperature of the high-temperature area (step S3). The scattering panel processor 1103 sets a scattering portion Pix overlapping the high-temperature area in the planar viewpoint as a portion included in a local scattering area (step S4). The light source processor 1104 sets a light source element overlapping the high-temperature area in the planar viewpoint as a portion included in a local turned-off area (step S5). Then, the scattering panel processor 1103 controls the operation of the scattering panel 20 in accordance with the operation mode determined by the mode selector 1102 at step S3, and the light source processor 1104 controls the operation of the backlight 101 in accordance with the operation mode determined by the mode selector 1102 at step S3 (step S6).

On the other hand, when it is determined that no partial temperature detection area PA that has become the high-temperature area having a temperature equal to or higher than the predetermined temperature is present at step S2 (No at step S2), the processing at each of step S3 to step S6 is omitted. When the processing at step S3 is omitted, the operation mode of the display system 100 is set to be an operation mode A to be described with reference to FIG. 15.

The process in the flowchart illustrated in FIG. 14 is repeated at a predetermined cycle. Specifically, the process illustrated in the flowchart in FIG. 14 is repeated at a cycle corresponding to a collection frequency of the temperature information that is determined based on a "Temperature Sensor Measurement Operation" in FIG. 15, which will be described later.

The operation modes of the display system 100 will be explained below with reference to FIGS. 15 to 19.

Figure 17:
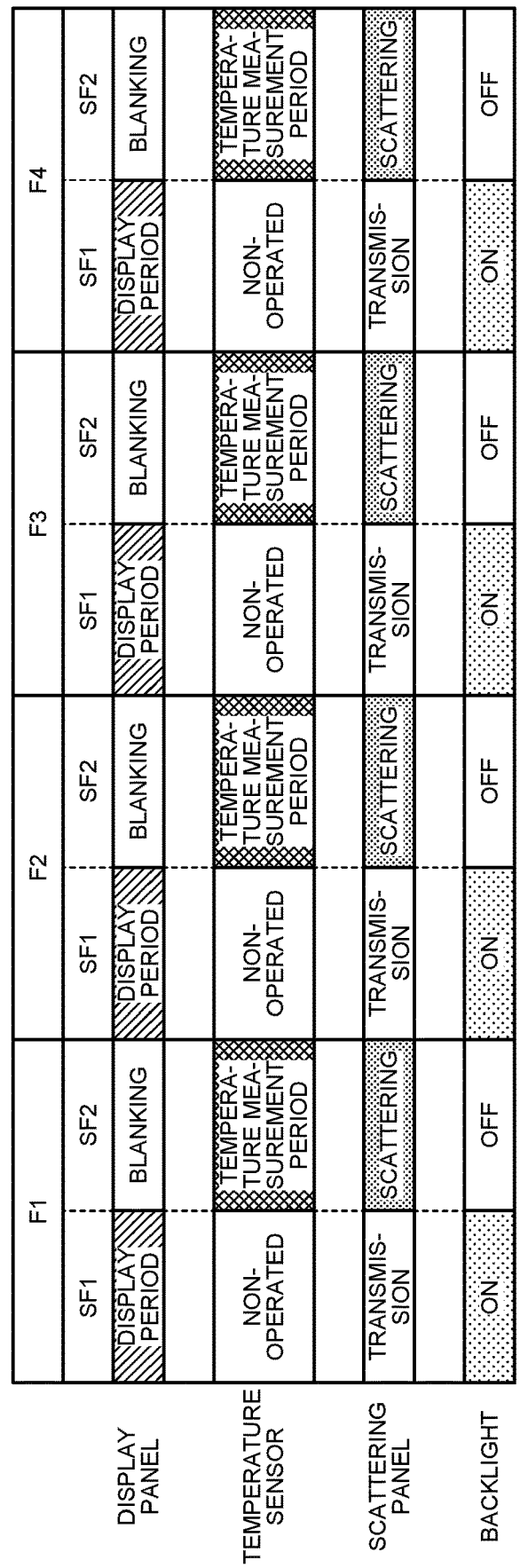
FIG. 17 is a time chart illustrating an example of an operation mode B illustrated in FIG. 15.
Figure 18:
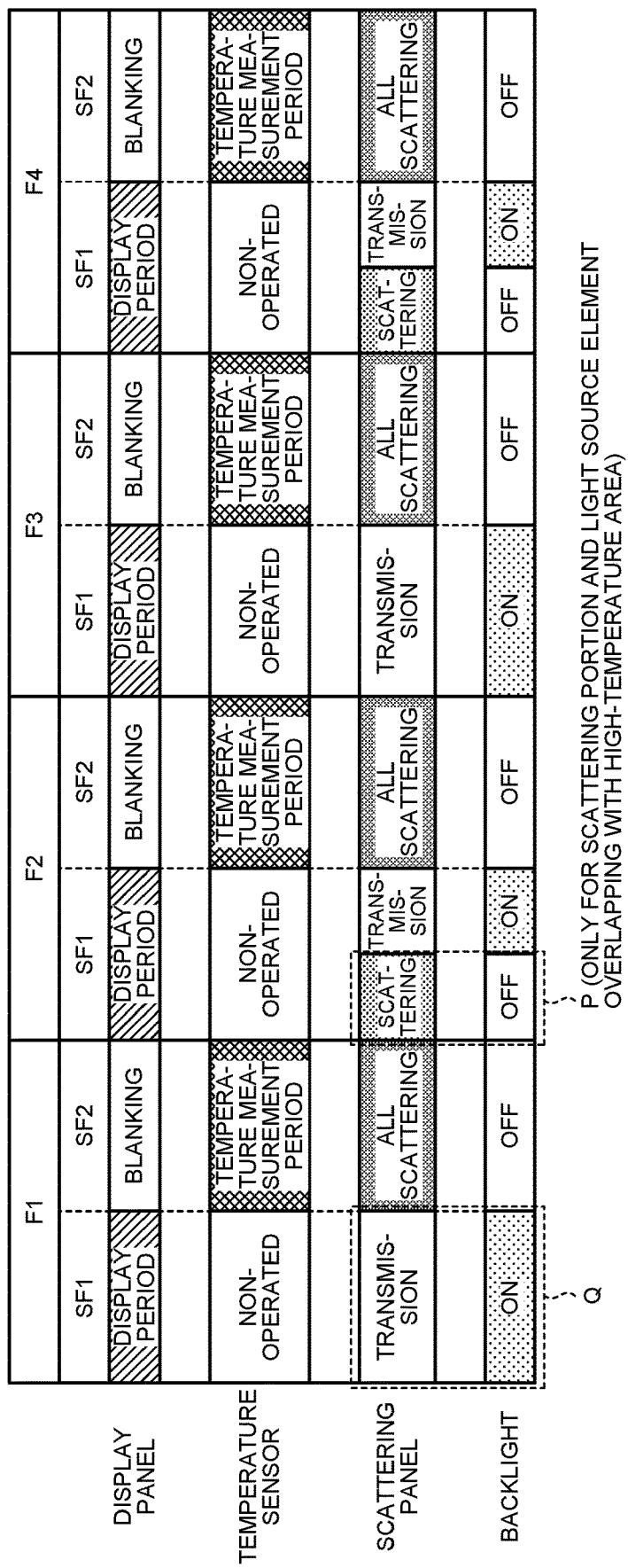
FIG. 18 is a time chart illustrating an example of an operation mode C illustrated in FIG. 15.

FIG. 15 is a table illustrating a list of the operation modes of the display system 100. FIG. 16 is a time chart illustrating an example of the operation mode A illustrated in FIG. 15. FIG. 17 is a time chart illustrating an example of an operation mode B illustrated in FIG. 15. FIG. 18 is a time chart illustrating an example of an operation mode C illustrated in FIG. 15. FIG. 19 is a time chart illustrating an example of an operation mode D illustrated in FIG. 15.

As illustrated in FIG. 15, the operation modes of the display system 100 include, for example, the operation mode A, the operation mode B, the operation mode C, and the operation mode D. The mode selector 1102 in the embodiment determines one of the operation mode A, the operation mode B, the operation mode C, and the operation mode D as the operation mode of the display system 100. The determination of the operation mode by the mode selector 1102 is made based on a relation between the temperatures of the respective partial temperature detection areas PA that are indicated by the temperature information collected by the above-mentioned processing at step S1 and a "Temperature Measurement Result" illustrated in FIG. 15.

As indicated by the "Temperature Measurement Result" in FIG. 15, when the temperature information collected by the above-mentioned processing at step S1 indicates that the temperatures of all of the partial temperature detection areas PA are lower than 60° C., the operation mode A is selected. When the temperature information collected by the above-mentioned processing at step S1 indicates that the temperature of at least one of the partial temperature detection areas PA is equal to or higher than 60° C. and lower than 75° C. and there is no partial temperature detection area PA having a temperature equal to or higher than 75° C., the operation mode B is selected. When the temperature information collected by the above-mentioned processing at step S1 indicates that the temperature of at least one of the partial temperature detection areas PA is equal to or higher than 75° C. and lower than 90° C. and there is no partial temperature detection area PA having a temperature equal to or higher than 90° C., the operation mode C is selected. When the temperature information collected by the above-mentioned processing at step S1 indicates that the temperature of at least one of the partial temperature detection areas PA is equal to or higher than 90° C., the operation mode D is selected.

As illustrated in FIG. 15, a "Display Operation", the "Temperature Sensor Measurement Operation", a "Scattering Panel Operation", and a "Backlight Operation" are defined individually for each of the operation mode A, the operation mode B, the operation mode C, and the operation mode D. The "Display Operation" indicates a refresh rate of the liquid crystal display panel 30. The "Temperature Sensor Measurement Operation" indicates a collection frequency of the temperature information by the temperature information collector 1101. The "Scattering Panel Operation" indicates operations of the scattering panel 20. The "Backlight Operation" indicates operations of the backlight 101.

For example, as illustrated in FIG. 15, the "Display Operation" is 60 frames per second (fps) in the operation mode A. Therefore, when the operation mode A is selected, the liquid crystal display panel 30 updates a frame image 60 times per second. In other words, there are 60 frame periods per second. One frame image is displayed in each frame period, and an output of the liquid crystal display panel 30 is updated each time the frame period shifts to the next frame period. The "Temperature Sensor Measurement Operation" is 60 fps in the operation mode A. Therefore, when the operation mode A is selected, the temperature information collector 1101 periodically outputs the drive signal to the input line Vin and acquires signals from the output lines Vout at a frequency of 60 times per second.

Frame periods F1, F2, F3, and F4 are exemplified in the time charts illustrated in FIG. 16, FIG. 17, FIG. 18, and FIG. 19. The frame periods F1, F2, F3, and F4 are exemplary excerpts of four frame periods.

Each frame period includes two sub-frame periods SF1 and SF2. In a first sub-frame period SF1, output by the liquid crystal display panel 30 is performed. As illustrated in FIG. 16, FIG. 17, FIG. 18 and FIG. 19, each first sub-frame period SF1 therefore functions as a period (display period) of output/updates by the liquid crystal display panel 30. In a second sub-frame period SF2, output of the drive signal to the input line Vin by the temperature information collector 1101, that is, the operation of the temperature detector 40, is performed. As illustrated in FIG. 16, FIG. 17, FIG. 18, and FIG. 19, each second sub-frame period SF2 therefore functions as an operation period (temperature measurement period) of the temperature detector 40. The temperature detector 40 in the first sub-frame period SF1 is in a non-operated state. The second sub-frame period SF2 is a blanking period for the liquid crystal display panel 30. During each blanking period, various preparation operations for outputting an image scheduled to be output in the next frame period, such as resetting of the capacitive elements of the pixels that hold the frame image, are performed.

As illustrated in FIG. 15, FIG. 16, FIG. 17, FIG. 18, and FIG. 19, in the embodiment, the "Display Operation" is 60 fps and the "Temperature Sensor Measurement Operation" is 60 fps in all of the operation mode A, the operation mode B, the operation mode C, and the operation mode D. They are, however, only examples and non-limiting. In any of the operation modes, at least one of the "Display Operation" and the "Temperature Sensor Measurement Operation" may be different from that in the other modes. In such a case, the operation of the liquid crystal display panel 30 is desirably controlled such that the amount of heat generated is smaller as the partial temperature detection area PA with a higher temperature is present. The operation of the temperature detector 40 is desirably controlled such that the operation frequency of the temperature detector 40 is lowered when the necessity to increase the operation frequency of the temperature detector 40 is relatively low as in the case where the temperatures of all the partial temperature detection areas PA are lower than the predetermined temperature.

As illustrated in FIG. 15, the "Scattering Panel Operation" is "Transmission In All Portions In All Periods" in the operation mode A. Therefore, when the operation mode A is selected, all the scattering portions Pix included in the scattering panel 20 are controlled to be in a state of transmitting light during all the periods regardless of the first sub-frame periods SF1 and SF2, as illustrated in FIG. 16. The "Backlight Operation" is "Turn On All Portions In All Periods" in the operation mode A. Therefore, when the operation mode A is selected, all the light source elements included in the backlight 101 are in an ON state like the turned-on light source elements ALA as explained with reference to FIG. 10, regardless of the first sub-frame periods SF1 and SF2.

As illustrated in FIG. 15, the "Scattering Panel Operation" is "Scattering In Blanking Periods" in the operation mode B. In the description of the "Scattering Panel Operation", "All Scattering" is to cause all the scattering portions Pix included in the scattering panel 20 to be in a state of scattering light (refer to FIG. 13). On the other hand, "Scattering" is to cause the scattering portion Pix at the position overlapping the hot spot HS the temperature of which has become a predetermined temperature or higher in the planar viewpoint among the scattering portions Pix included in the scattering panel 20 to be in a state of scattering light (refer to FIG. 12). The "local scattering area" in the above-mentioned processing at step S4 indicates a partial area of the scattering area 7 in which the scattering portion Pix at the position overlapping the hot spot HS having a temperature equal to or higher than the predetermined temperature in the planar viewpoint is arranged.

When the operation mode B is selected, the scattering portion Pix overlapping the partial temperature detection area PA having a temperature equal to or higher than the predetermined temperature is controlled to be in a state of scattering light during the second sub-frame period SF2 as illustrated in FIG. 17. In the operation mode B, all the scattering portions Pix are controlled to be in a state of transmitting light during the first sub-frame period SF1. The "Backlight Operation" is "Turn Off In Blanking Periods" in the operation mode B. Therefore, when the operation mode B is selected, all the light source elements included in the backlight 101 are controlled to be in an ON state during the first sub-frame period SF1 (refer to FIG. 10) and to be in an OFF state during the second sub-frame period SF2 (refer to FIG. 13).

In the operation mode C, the "Scattering Panel Operation" is "All Scattering In Blanking Periods, Scattering For ½ Frame Period Of Display Once Every Two Frames Of Display For High-Temperature Area" as illustrated in FIG. 15. Therefore, when the operation mode C is selected, all the scattering portions Pix are controlled to be in a state of scattering light during the second sub-frame period SF2, as illustrated in FIG. 18. When a partial temperature detection area PA the temperature of which has become a predetermined temperature (equal to or higher than 75 degrees and lower than 90 degrees, in this example) is referred to as a high-temperature area, the scattering portion(s) Pix overlapping the high-temperature area(s) is/are further controlled to scatter light also during the first sub-frame periods SF1. More specifically, the scattering portion(s) Pix overlapping the high-temperature area(s) is/are controlled to be in a state of scattering light for a ½ period in the first sub-frame period SF1 included in one of two consecutive frame periods (for example, for a ¼ period of one frame) and is/are controlled to be in a state of transmitting light for the remaining ½ period therein. The remaining scattering portion(s) Pix not overlapping the high-temperature area(s) is/are kept in a state of transmitting light during the sub-frame period SF1 (refer to P in FIG. 18).

During the first sub-frame period SF1 included in the other of the two consecutive frame periods, all the scattering portions are controlled to be in a state of transmitting light. More specifically, during the first sub-frame period SF1 of the other frame period, the scattering portion(s) Pix overlapping the high-temperature area(s) and the remaining scattering portion(s) Pix are controlled to be in a state of transmitting light (refer to Q in FIG. 18).

The "Backlight Operation" is "Turn Off In Blanking Periods, Turn Off For ½ Frame Period Of Display Once Every Two Frames Of Display For High-Temperature Area" in the operation mode C. Therefore, when the operation mode C is selected, all the light source elements included in the backlight 101 are controlled to be in an OFF state during the second sub-frame period SF2 (refer to FIG. 13). The light source element(s) overlapping the high-temperature area(s) PA is/are further controlled to be in an OFF state also during the first sub-frame frames SF1. More specifically, the light source element(s) overlapping the high-temperature area(s) is/are controlled to be in an OFF state for a ½ period in the first sub-frame period SF1 included in one of two consecutive frame periods (for example, for a ¼ period of one frame) and is/are controlled to be in an ON state for the remaining ½ period therein. The remaining light source element(s) not overlapping the high-temperature area(s) is/are kept ON during the sub-frame period SF1 (refer to P in FIG. 18).

During the first sub-frame period SF1 included in the other of the two consecutive frame periods, all the light source elements of the backlight are controlled to be in an ON state. More specifically, during the first sub-frame period SF1 of the other frame period, the light source element(s) overlapping the high-temperature area(s) in the planar viewpoint and the remaining light source elements are controlled to be in an ON state (refer to Q in FIG. 18).

With such control of the scattering portions and the light source elements, even in the operation mode C where the temperature of a part of the display area is detected to be high, the display can be maintained while a further increase in the temperature of the part is restrained, and a decrease in the temperature of the part can be facilitated.

In the operation mode D, the "Scattering Panel Operation" is "All Scattering In Blanking Periods, Scattering For One Frame Period Of Display Once Every Two Frames Of Display For Anomalous High-Temperature Area" as illustrated in FIG. 15. Therefore, when the operation mode D is selected, all the scattering portions Pix are controlled to be in a state of scattering light during the second sub-frame period SF2, as illustrated in FIG. 19. When a partial temperature detection area PA the temperature of which has become a temperature equal to or higher than a predetermined temperature (in this example, 90 degrees) is referred to as an anomalous high-temperature area, the scattering portion(s) Pix overlapping the anomalous high-temperature area(s) is/are further controlled to scatter light also during the first sub-frame period SF1. More specifically, the scattering portion(s) Pix overlapping the anomalous high-temperature area(s) is/are controlled to be in a state of scattering light over the entire first sub-frame period SF1 included in one of two consecutive frame periods. The remaining scattering portion(s) Pix not overlapping the anomalous high-temperature area(s) is/are kept in a state of transmitting light during the sub-frame period SF1 (refer to R in FIG. 19).

During the first sub-frame period SF1 included in the other of the two consecutive frame periods, all the scattering portions are controlled to be in a state of transmitting light. More specifically, during the first sub-frame period SF1 of the other frame period, the scattering portions Pix overlapping the anomalous high-temperature area(s) and the remaining scattering portion(s) Pix are controlled to be in a state of transmitting light (refer to S in FIG. 19).

The "Backlight Operation" is "Turn Off In Blanking Periods, Turn Off For One Frame Period Of Display Once Every Two Frames Of Display For Anomalous High-Temperature Area" in the operation mode D. Therefore, when the operation mode D is selected, all the light source elements included in the backlight 101 are controlled to be in an OFF state during the second sub-frame period SF2 (refer to FIG. 13). The light source element(s) overlapping the anomalous high-temperature area(s) is/are further controlled to be in an OFF state also during the first sub-frame periods SF1. More specifically, the light source element(s) overlapping the anomalous high-temperature area(s) is/are controlled to be in an OFF state during the entire first sub-frame period SF1 included in one of two consecutive frame periods. The remaining light source element(s) not overlapping the anomalous high-temperature area(s) is/are kept ON during the sub-frame period SF1 (refer to R in FIG. 19).

During the first sub-frame period SF1 included in the other of the two consecutive frame periods, all the light source elements of the backlight are controlled to be in an ON state. More specifically, during the first sub-frame period SF1 of the other frame period, the light source element(s) overlapping the anomalous high-temperature area(s) in the planar viewpoint and the remaining light source elements is/are controlled to be in an ON state (refer to S in FIG. 19).

With such control of the scattering portions and the light source elements, even in the operation mode D where the temperature of a part of the display area is detected to be anomalously high, the display can be maintained while a further increase in the temperature of the part is restrained as compared with the operation mode C, and a decrease in the temperature of the part can be facilitated.

In the operation mode C and the operation mode D, a partial area including the light source element overlapping the high-temperature area or the anomalous high-temperature area in the planar viewpoint among the light source elements included in the backlight 101 corresponds to the "local turned-off area" in the above-mentioned processing at step S5.

In the examples illustrated in FIGS. 18 and 19, one of the two consecutive frame periods corresponds to each of the frame periods F2 and F4, and the other frame period thereof corresponds to each of the frame periods F1 and F3. The one frame period and the other frame period may, however, be reversed. In the example, the first sub-frame period SF1 is set to be ½ of the frame period and the second sub-frame period SF2 is set to be ½ of the frame period. Alternatively, a configuration can be employed in which the first sub-frame period SF1 is set to be ⅔ of the frame period and the second sub-frame period SF2 is set to be ⅓ of the frame period, or a configuration can be employed in which these time lengths are reversed. Alternatively, a configuration can be employed in which the first sub-frame period SF1 is set to ¾ of the frame period and the second sub-frame period SF2 is set to ¼ of the frame period, or a configuration can be employed in which these time lengths are reversed. As described above, there is no particular restriction on the length of time for each of the first sub-frame period SF1 and the second sub-frame period SF2 as long as the total of these sub-frame periods corresponds to the length of one frame period.

The temperature status of each of the partial temperature detection areas PA is individually determined, thus at least one high-temperature area and/or at least one anomalous high-temperature area might be present simultaneously, in some cases. For example, if a high-temperature area and an anomalous high-temperature area are present simultaneously, a scattering portion Pix and a light source element overlapping the high-temperature area are controlled in the operation mode C, and a scattering portion Pix and a light source element overlapping the anomalous high-temperature area are controlled in the operation mode D.

In the above description, the display panel 10 has the multilayered configuration illustrated in FIG. 2. The multilayered configuration is, however, not limited to that illustrated in FIG. 2. The following describes other examples of the multilayered configuration with reference to FIGS. 20 to 22.

FIG. 20 is a schematic view illustrating an example of the multilayered configuration of a display panel 10A. The display panel 10A illustrated in FIG. 20 has the multilayered configuration in which the scattering panel 20, a first adhesive layer 75a, the temperature detector 40, a second adhesive layer 75b, the polarizing plate 72, the liquid crystal display panel 30, and the polarizing plate 73 are stacked from one surface side to the other surface side.

The first adhesive layer 75a bonds the plate surface of the scattering panel 20 and the plate surface of the temperature detector 40 to each other. The second adhesive layer 75b bonds the plate surface of the temperature detector 40 and the plate surface of the polarizing plate 72 to each other. Specifically, the first adhesive layer 75a and the second adhesive layer 75b are the OCAs, and both sides thereof have adhesive properties. As described above, the display panel 10A is similar to the display panel 10 except for the specially mentioned matters. The display panel 10 illustrated in FIG. 1 may be replaced by the display panel 10A.

FIG. 21 is a schematic view illustrating an example of the multilayered configuration of a display panel 10B. The display panel 10B illustrated in FIG. 21 has the multilayered configuration in which the temperature detector 40, a first adhesive layer 76a, the scattering panel 20, a second adhesive layer 76b, the polarizing plate 72, the liquid crystal display panel 30, and the polarizing plate 73 are stacked from one surface side to the other surface side.

The first adhesive layer 76a bonds the plate surface of the temperature detector 40 and the plate surface of the scattering panel 20 to each other. The second adhesive layer 76b bonds the plate surface of the scattering panel 20 and the plate surface of the polarizing plate 72 to each other. Specifically, the first adhesive layer 76a and the second adhesive layer 76b are the OCAs, and both sides thereof have adhesive properties. As described above, the display panel 10B is similar to the display panel 10 except for the specially mentioned matters. The display panel 10 illustrated in FIG. 1 may be replaced by the display panel 10B.

FIG. 22 is a schematic view illustrating an example of the multilayered configuration of a display panel 10C. The display panel 10C illustrated in FIG. 22 has the multilayered configuration in which the scattering panel 20, an adhesive layer 77, the polarizing plate 72, a liquid crystal display panel 300, and the polarizing plate 73 are stacked from one surface side to the other surface side. The adhesive layer 77 bonds the plate surface of the scattering panel 20 and the plate surface of the polarizing plate 72 to each other. Specifically, the adhesive layer 77 is the OCA, and both sides thereof have adhesive properties.

The liquid crystal display panel 300 is configured by integrating the liquid crystal display panel 30 and the temperature detector 40. Thus, the temperature detector 40 in FIG. 2, FIG. 20, and FIG. 21 is provided to the liquid crystal display panel 30 by an out-cell method, whereas the liquid crystal display panel 300 includes the temperature detector in a form adopting an in-cell method. Specifically, a circuit layer 400 corresponding to the configuration of the temperature detector 40 explained with reference to FIG. 5 is formed on a first substrate 301 of the liquid crystal display panel 300. The liquid crystal display panel 300 is a transmissive liquid crystal display panel in which a liquid crystal layer is sealed between the first substrate 301 and a second substrate 302. A wiring portion 85 included in the liquid crystal display panel 300 includes both the wiring portion 82 and the wiring portion 83 mentioned above. The wiring portion 85 may have a configuration having branches such that one branch thereof is coupled to the temperature sensor I/F 118 and another branch thereof is coupled to the display panel I/F 121. The controller 110 may include an interface configured by integrating the temperature sensor I/F 118 and the display panel I/F 121.

Although the wiring portions 81, 82, 83, 84, and 85 are, for example, flexible printed circuits (FPCs), the wiring portions are not limited thereto. The specific configurations of the wiring portions 81, 82, 83, 84, and 85 can be appropriately changed as long as they have configurations capable of being coupled to the controller 110 and including wiring.

As explained above, according to the embodiment, the display system 100 includes the transmissive liquid crystal display panel (the liquid crystal display panel 30 or the liquid crystal display panel 300), the scattering panel 20 having the scattering area 7 in which the scattering portions Pix capable of being switched between scattering and transmission of light are provided, the temperature detector (the temperature detector 40 or the circuit layer 400) having the temperature detection area SA in which the temperature detection resistor elements ER (resistors ER) are provided, the light source (backlight 101) configured to emit projection light to the liquid crystal display panel, and the controller 110 configured to control the operations of the scattering panel 20 and the light source based on the output of the temperature detector corresponding to the temperatures of the resistors ER. The display area AA of the liquid crystal display panel, the scattering area 7, and the temperature detection area SA overlap one another. The projection light L that has passed through the display area AA and the scattering area 7 is projected onto the light-transmitting projection target (for example, the projection plate WS) to allow the virtual image VI to be viewed by the user. When an output indicating that the temperature of the resistor ER is equal to or higher than a predetermined temperature is acquired, the controller 110 causes the corresponding scattering portion Pix to scatter light.

With this configuration, the scattering portion Pix controlled to scatter light can scatter the sunlight LL to be incident from the outside on the liquid crystal display panel (the liquid crystal display panel 30 or the liquid crystal display panel 300). Therefore, even if the temperature of the liquid crystal display panel becomes a temperature of a predetermined temperature or higher due to the incidence of the sunlight LL, further increase in the temperature after the temperature becomes the temperature of the predetermined temperature or higher can be restrained.

A plurality of the scattering portions Pix and a plurality of the resistors ER are provided. Positions that respectively overlap the resistors ER are each provided with one or more of the scattering portions Pix. The controller 110 causes a scattering portion Pix overlapping the resistor ER having a temperature equal to or higher than the predetermined temperature among the resistors ER to scatter light. With this configuration, when the temperature of the liquid crystal display panel becomes a temperature equal to or higher than the predetermined temperature due to the incidence of the sunlight LL, light can be scattered in the partial area corresponding to the spot (for example, the hot spot HS) where the temperature becomes equal to or higher than the predetermined temperature while light is not scattered in the other areas.

The first temperature (for example, 60° C.) and the second temperature (for example, 75° C.) higher than the first temperature are each set as the predetermined temperature. A first period (first sub-frame period SF1) in which the liquid crystal display panel outputs (updates) an image and a second period (the second sub-frame period SF2) in which the liquid crystal display panel does not output (update) an image are alternately repeated. When an output indicating that a temperature of a resistor ER among the resistors ER is equal to or higher than the first temperature and lower than the second temperature is acquired, the controller 110 causes, among the scattering portions Pix, a scattering portion Pix overlapping the resistor ER having the temperature equal to or higher than the first temperature among the resistors ER to scatter light during the second period. When an output indicating that a temperature of a resistor ER among the resistors ER is equal to or higher than the second temperature is acquired, the controller 110 causes all the scattering portions Pix to scatter light during the second period. This control can reduce incidence of the sunlight LL on the liquid crystal display panel the temperature of which has become equal to or higher than the second temperature more reliably. Further increase in the temperature after the temperature becomes equal to or higher than the second temperature can therefore be restrained more reliably.

The third temperature (for example, 90° C.) higher than the second temperature (for example, 75° C.) is set as the predetermined temperature. When an output indicating that a temperature of a resistor ER among the resistors ER is equal to or higher than the second temperature and lower than the third temperature is acquired, the controller causes, among the scattering portions Pix, a scattering portion Pix overlapping the resistor ER having the temperature equal to or higher than the second temperature to scatter light over a half period of one first period in two of the first periods (first sub-frame periods SF1). When an output indicating that the temperature of the resistor ER is equal to or higher than the third temperature is acquired, the controller causes, among the scattering portions Pix, a scattering portion Pix overlapping the resistor ER having the temperature equal to or higher than the third temperature to scatter light over one first period in two of the first periods. This control can change time to be allocated to scattering of the sunlight LL in the first period, depending on whether the temperature is equal to or higher than the second temperature and lower than the third temperature, or equal to or higher than the third temperature; thereby achieving maintenance of projection of the virtual image and restraint of temperature increase more preferably.

The backlight 101 includes more than one light source element. Positions that respectively overlap the resistors ER are each provided with one or more of light source elements. During the period when all the scattering portions Pix scatter light, the controller 110 causes all the light source elements to be in an OFF state. During the period when the scattering portion Pix overlapping the resistor ER having the temperature equal to or higher than the first temperature scatters light, the controller 110 causes, among the light source elements, a light source element overlapping the resistor ER having the temperature equal to or higher than the first temperature (for example, 60° C.) to be in an OFF state and light source elements not overlapping the resistor ER having the temperature equal to or higher than the first temperature to be in an ON state. During the other periods, the controller 110 causes all the light source elements to be in an ON state. This control can restrain further increase in the temperature due to heat generation by the light source element overlapping the resistor ER having the temperature equal to or higher than the first temperature. Power consumption can be further reduced by restraining the light source elements from being turned on unnecessarily at the spot where the scattering portion Pix operates and projection of the virtual image is not performed.

In the explanation with reference to FIGS. 10 to 13, the light source elements in the backlight 101 is arranged one for each of the partial temperature detection areas PA. This is, however, only an arrangement example of the light source elements, and the arrangement and the number of the light source elements are not limited thereto. More than one of the light source elements may be arranged in each of the positions that respectively overlap the partial temperature detection areas PA. In such a case, the light source elements overlapping one partial temperature detection area PA are provided in the backlight 101 as one set of the light source elements, and the light source elements can be switched to be turned on and off for each set of the light source elements.

In the explanation with reference to FIG. 15, the first temperature is 60° C., the second temperature is 75° C., and the third temperature is 90° C. These temperatures are, however, only examples and non-limiting. The first temperature, the second temperature, and the third temperature are set to be appropriate temperatures depending on characteristics of the display panel 10, such as the temperature tolerance of the liquid crystal display panel 30.

Other action effects provided by the modes described in the embodiment that are obvious from description of the present specification or at which those skilled in the art can appropriately arrive should be interpreted to be provided by the present disclosure.

What is claimed is:

1. A display system comprising:
a transmissive liquid crystal display panel;
a scattering panel having a scattering area in which a scattering portion capable of being switched between scattering and transmission of light is provided;
a temperature detector having a temperature detection area in which a temperature detection resistor element is provided;
a light source configured to emit projection light to the liquid crystal display panel; and
a controller configured to control operations of the scattering panel and the light source based on an output of the temperature detector corresponding to a temperature of the temperature detection resistor element, wherein
a display area of the liquid crystal display panel, the scattering area, and the temperature detection area overlap one another,
the projection light that has passed through the display area and the scattering area is projected onto a light-transmitting projection target to allow a virtual image to be viewed by a user, and
when an output indicating that the temperature of the temperature detection resistor element is equal to or higher than a predetermined temperature is acquired, the controller causes the scattering portion to scatter light.

2. The display system according to claim 1, wherein
a plurality of the scattering portions and a plurality of the temperature detection resistor elements are provided,
positions that respectively overlap the temperature detection resistor elements are each provided with one or more of the scattering portions, and
the controller causes, among the scattering portions, a scattering portion overlapping a temperature detection resistor element having a temperature equal to or higher than the predetermined temperature among the temperature detection resistor elements to scatter light.

3. The display system according to claim 2, wherein
a first temperature and a second temperature higher than the first temperature are each set as the predetermined temperature,
a first period during which the liquid crystal display panel updates an image and a second period during which the liquid crystal display panel does not update an image are alternately repeated,
when an output indicating that a temperature of a temperature detection resistor element among the temperature detection resistor elements is equal to or higher than the first temperature and lower than the second temperature is acquired, the controller causes, among the scattering portions, a scattering portion overlapping the temperature detection resistor element having the temperature equal to or higher than the first temperature among the temperature detection resistor elements to scatter light during the second period, and
when an output indicating that a temperature of a temperature detection resistor element among the temperature detection resistor elements is equal to or higher than the second temperature is acquired, the controller causes all the scattering portions to scatter light during the second period.

4. The display system according to claim 3, wherein
a third temperature higher than the second temperature is set as the predetermined temperature,
when an output indicating that an temperature of a temperature detection resistor element among the temperature detection resistor elements is equal to or higher than the second temperature and lower than the third temperature is acquired, the controller causes, among the scattering portions, a scattering portion overlapping the temperature detection resistor element having the temperature equal to or higher than the second temperature to scatter light over a half of one first period in two of the first periods, and when an output indicating that a temperature of a temperature detection resistor element among the temperature detection resistor elements is equal to or higher than the third temperature is acquired, the controller causes, among the scattering portions, a scattering portion overlapping the temperature detection resistor element having the temperature equal to or higher than the third temperature to scatter light over one first period in two of the first periods.

5. The display system according to claim 3, wherein the light source includes a plurality of light source elements, positions that respectively overlap the temperature detection resistor elements are each provided with one or more of the light source elements, during the period when all the scattering portions scatter light, the controller causes all the light source elements to be in an OFF state, during the period when the scattering portion overlapping the temperature detection resistor element having the temperature equal to or higher than the first temperature scatters light, the controller causes, among the light source elements, a light source element overlapping the temperature detection resistor element having the temperature equal to or higher than the first temperature to be in an OFF state and a light source element not overlapping the temperature detection resistor element having the temperature equal to or higher than the first temperature to be in an ON state, and during the other periods, the controller causes all the light source elements to be in an ON state.

6. A head-up display comprising:

a transmissive liquid crystal display panel;

a scattering panel having a scattering area in which a scattering portion capable of being switched between scattering and transmission of light is provided;

a temperature detector having a temperature detection area in which a temperature detection resistor element is provided;

a light source configured to emit projection light to the liquid crystal display panel; and a controller configured to control operations of the scattering panel and the light source based on an output of the temperature detector corresponding to a temperature of the temperature detection resistor element, wherein a display area of the liquid crystal display panel, the scattering area, and the temperature detection area overlap one another, the projection light that has passed through the display area and the scattering area is projected onto a light-transmitting projection target to allow a virtual image to be viewed by a user, and when an output indicating that the temperature of the temperature detection resistor element is equal to or higher than a predetermined temperature is acquired, the controller causes the scattering portion to scatter light.

* * * * *